US009369356B2

(12) United States Patent
Bansal et al.

(10) Patent No.: US 9,369,356 B2
(45) Date of Patent: Jun. 14, 2016

(54) CONDUCTING A DIAGNOSTIC SESSION FOR MONITORED BUSINESS TRANSACTIONS

(71) Applicant: AppDynamics Inc., San Francisco, CA (US)

(72) Inventors: Jyoti Bansal, San Francisco, CA (US); Bhaskar Sunkara, San Francisco, CA (US)

(73) Assignee: AppDynamics, Inc., San Francisco, CA (US)

( * ) Notice: Subject to any disclaimer, the term of this patent is extended or adjusted under 35 U.S.C. 154(b) by 0 days.

(21) Appl. No.: 14/690,254

(22) Filed: Apr. 17, 2015

(65) Prior Publication Data
US 2015/0222503 A1  Aug. 6, 2015

Related U.S. Application Data

(63) Continuation of application No. 14/071,525, filed on Nov. 4, 2013, now Pat. No. 9,015,317, which is a continuation of application No. 13/189,360, filed on Jul. 22, 2011, now Pat. No. 8,938,533, which is a continuation-in-part of application No. 12/878,919, filed on Sep. 9, 2010, now Pat. No. 9,167,028.

(60) Provisional application No. 61/241,256, filed on Sep. 10, 2009.

(51) Int. Cl.
*G06F 15/173* (2006.01)
*H04L 12/26* (2006.01)
*H04L 29/08* (2006.01)

(52) U.S. Cl.
CPC .............. *H04L 43/04* (2013.01); *H04L 43/022* (2013.01); *H04L 43/045* (2013.01); *H04L 43/10* (2013.01); *H04L 67/02* (2013.01); *H04L 67/22* (2013.01)

(58) Field of Classification Search
USPC ........................................ 709/224
IPC ........ H04L 67/10,43/50, 41/5083, 43/04; G06Q 40/00
See application file for complete search history.

(56) References Cited

U.S. PATENT DOCUMENTS

| 5,781,703 | A | 7/1998 | Desai et al. |
| 6,002,872 | A | 12/1999 | Alexander et al. |
| 6,158,024 | A | 12/2000 | Mandal |

(Continued)

OTHER PUBLICATIONS

U.S. Appl. No. 13/365,171; Office Action mailed May 7, 2015.

(Continued)

*Primary Examiner* — Anthony Mejia
(74) *Attorney, Agent, or Firm* — Bachmann Law Group

(57) ABSTRACT

The present technology may determine an anomaly in a portion of a distributed business application. Data can automatically be captured and analyzed for the portion of the application associated with the anomaly. By automatically capturing data for just the portion associated with the anomaly, the present technology reduces the resource and time requirements associated with other code-based solutions for monitoring transactions. A method for performing a diagnostic session for a request may begin with initiating collection of diagnostic data associated with a request. An application thread on each of two or more servers may be sampled. The application threads may be associated with the same business transaction and the business transaction may be associated with the request. The diagnostic data may be stored.

9 Claims, 17 Drawing Sheets

(56) References Cited

U.S. PATENT DOCUMENTS

| | | | |
|---|---|---|---|
| 6,225,995 B1 | 5/2001 | Jacobs et al. | |
| 6,295,548 B1* | 9/2001 | Klein | G06F 9/466 |
| | | | 707/999.01 |
| 6,324,492 B1 | 11/2001 | Rowe | |
| 6,324,683 B1 | 11/2001 | Fuh et al. | |
| 6,349,406 B1 | 2/2002 | Levine et al. | |
| 6,378,070 B1 | 4/2002 | Chan et al. | |
| 6,457,142 B1 | 9/2002 | Klemm et al. | |
| 6,496,825 B1 | 12/2002 | Klein et al. | |
| 6,507,805 B1 | 1/2003 | Gordon et al. | |
| 6,513,155 B1 | 1/2003 | Alexander et al. | |
| 6,529,932 B1 | 3/2003 | Dadiomov et al. | |
| 6,539,339 B1 | 3/2003 | Berry et al. | |
| 6,546,548 B1 | 4/2003 | Berry et al. | |
| 6,553,564 B1 | 4/2003 | Alexander et al. | |
| 6,560,773 B1 | 5/2003 | Alexander et al. | |
| 6,598,012 B1 | 7/2003 | Berry et al. | |
| 6,604,210 B1 | 8/2003 | Alexander et al. | |
| 6,651,243 B1 | 11/2003 | Berry et al. | |
| 6,658,652 B1 | 12/2003 | Alexander et al. | |
| 6,662,358 B1 | 12/2003 | Berry et al. | |
| 6,718,230 B2 | 4/2004 | Nishiyama | |
| 6,721,941 B1 | 4/2004 | Morshed et al. | |
| 6,728,949 B1 | 4/2004 | Bryant et al. | |
| 6,728,955 B1 | 4/2004 | Berry et al. | |
| 6,732,357 B1 | 5/2004 | Berry et al. | |
| 6,735,758 B1 | 5/2004 | Berry et al. | |
| 6,751,789 B1 | 6/2004 | Berry et al. | |
| 6,754,890 B1 | 6/2004 | Berry et al. | |
| 6,760,903 B1* | 7/2004 | Morshed | G06F 11/3466 |
| | | | 717/130 |
| 6,904,594 B1 | 6/2005 | Berry et al. | |
| 6,944,797 B1 | 9/2005 | Guthrie et al. | |
| 6,978,401 B2 | 12/2005 | Avvari et al. | |
| 6,985,912 B2 | 1/2006 | Mullins et al. | |
| 6,990,521 B1 | 1/2006 | Ross | |
| 7,124,354 B1 | 10/2006 | Ramani et al. | |
| 7,233,941 B2 | 6/2007 | Tanaka | |
| 7,328,213 B2 | 2/2008 | Suzuki et al. | |
| 7,389,497 B1 | 6/2008 | Edmark et al. | |
| 7,389,514 B2 | 6/2008 | Russell et al. | |
| 7,406,523 B1* | 7/2008 | Kruy | H04L 67/14 |
| | | | 709/203 |
| 7,496,901 B2* | 2/2009 | Begg | G06F 11/3466 |
| | | | 717/128 |
| 7,499,951 B2 | 3/2009 | Mueller et al. | |
| 7,506,047 B2 | 3/2009 | Wiles, Jr. | |
| 7,519,959 B1 | 4/2009 | Dmitriev | |
| 7,523,067 B1 | 4/2009 | Nakajima | |
| 7,577,105 B2 | 8/2009 | Takeyoshi et al. | |
| 7,606,814 B2* | 10/2009 | Deily | G06F 17/30902 |
| 7,689,688 B2* | 3/2010 | Iwamoto | H04L 41/5009 |
| | | | 709/201 |
| 7,721,268 B2 | 5/2010 | Loh et al. | |
| 7,730,489 B1 | 6/2010 | Duvur et al. | |
| 7,739,675 B2* | 6/2010 | Klein | G06F 11/3612 |
| | | | 717/151 |
| 7,792,948 B2* | 9/2010 | Zhao | H04L 41/046 |
| | | | 709/224 |
| 7,836,176 B2 | 11/2010 | Gore et al. | |
| 7,844,033 B2 | 11/2010 | Drum et al. | |
| 7,877,642 B2 | 1/2011 | Ding et al. | |
| 7,886,297 B2 | 2/2011 | Nagano et al. | |
| 7,908,346 B2 | 3/2011 | Boykin et al. | |
| 7,953,850 B2* | 5/2011 | Mani | H04L 67/02 |
| | | | 709/224 |
| 7,953,895 B1* | 5/2011 | Narayanaswamy | H04L 43/10 |
| | | | 370/351 |
| 7,966,172 B2* | 6/2011 | Ruiz | G06F 17/27 |
| | | | 704/1 |
| 7,979,569 B2 | 7/2011 | Eisner et al. | |
| 7,987,453 B2 | 7/2011 | Dewitt et al. | |
| 7,992,045 B2 | 8/2011 | Bansal et al. | |
| 8,001,546 B2 | 8/2011 | Felt et al. | |
| 8,005,943 B2* | 8/2011 | Zuzga | G06F 11/3419 |
| | | | 709/224 |
| 8,069,140 B2 | 11/2011 | Enenkiel | |
| 8,099,631 B2 | 1/2012 | Tsvetkov | |
| 8,117,599 B2 | 2/2012 | Edmark et al. | |
| 8,132,170 B2 | 3/2012 | Kulper et al. | |
| 8,155,987 B2 | 4/2012 | Jaeck et al. | |
| 8,205,035 B2 | 6/2012 | Reddy et al. | |
| 8,286,139 B2 | 10/2012 | Jones et al. | |
| 8,438,427 B2 | 5/2013 | Beck et al. | |
| 8,560,449 B1 | 10/2013 | Sears | |
| 8,606,692 B2 | 12/2013 | Carleton et al. | |
| 8,843,684 B2 | 9/2014 | Jones et al. | |
| 8,938,533 B1 | 1/2015 | Bansal | |
| 9,015,317 B2 | 4/2015 | Bansal | |
| 9,037,707 B2 | 5/2015 | Bansal | |
| 2002/0016839 A1* | 2/2002 | Smith | G06Q 40/00 |
| | | | 709/224 |
| 2002/0021796 A1* | 2/2002 | Schessel | H04M 3/4217 |
| | | | 379/207.02 |
| 2002/0052962 A1* | 5/2002 | Cherkasova | H04L 41/5019 |
| | | | 709/229 |
| 2002/0110091 A1 | 8/2002 | Rosborough et al. | |
| 2003/0093433 A1 | 5/2003 | Seaman et al. | |
| 2003/0158944 A1* | 8/2003 | Branson | G06Q 30/06 |
| | | | 709/227 |
| 2003/0206192 A1 | 11/2003 | Chen et al. | |
| 2004/0015920 A1 | 1/2004 | Schmidt | |
| 2004/0049574 A1* | 3/2004 | Watson | G06F 17/30905 |
| | | | 709/224 |
| 2004/0133882 A1 | 7/2004 | Angel et al. | |
| 2004/0193552 A1 | 9/2004 | Ikenaga et al. | |
| 2004/0193612 A1 | 9/2004 | Chang | |
| 2004/0199815 A1 | 10/2004 | Dinker et al. | |
| 2004/0215768 A1* | 10/2004 | Oulu | G06F 11/3495 |
| | | | 709/224 |
| 2004/0230956 A1 | 11/2004 | Cirne et al. | |
| 2005/0004952 A1* | 1/2005 | Suzuki | G06F 9/466 |
| 2005/0021736 A1* | 1/2005 | Carusi | H04L 12/2602 |
| | | | 709/224 |
| 2005/0071447 A1 | 3/2005 | Masek et al. | |
| 2005/0210454 A1 | 9/2005 | DeWitt et al. | |
| 2005/0235054 A1* | 10/2005 | Kadashevich | G06F 11/3466 |
| | | | 709/223 |
| 2006/0015512 A1 | 1/2006 | Alon et al. | |
| 2006/0059486 A1 | 3/2006 | Loh et al. | |
| 2006/0075386 A1 | 4/2006 | Loh et al. | |
| 2006/0130001 A1 | 6/2006 | Beuch et al. | |
| 2006/0136920 A1 | 6/2006 | Nagano et al. | |
| 2006/0143188 A1* | 6/2006 | Bright | G06F 17/30876 |
| 2006/0155753 A1 | 7/2006 | Asher et al. | |
| 2006/0291388 A1* | 12/2006 | Amdahl | H04L 12/4641 |
| | | | 370/230 |
| 2007/0038896 A1 | 2/2007 | Champlin et al. | |
| 2007/0074150 A1 | 3/2007 | Jolfaei et al. | |
| 2007/0124342 A1* | 5/2007 | Yamamoto | G06F 9/466 |
| 2007/0143290 A1* | 6/2007 | Fujimoto | G06Q 30/02 |
| 2007/0150568 A1 | 6/2007 | Ruiz | |
| 2007/0250600 A1 | 10/2007 | Freese et al. | |
| 2007/0266148 A1 | 11/2007 | Ruiz et al. | |
| 2008/0034417 A1* | 2/2008 | He | H04L 67/02 |
| | | | 726/15 |
| 2008/0066068 A1 | 3/2008 | Felt et al. | |
| 2008/0109684 A1* | 5/2008 | Addleman | G06F 11/3447 |
| | | | 714/47.2 |
| 2008/0134209 A1* | 6/2008 | Bansal | G06F 11/3612 |
| | | | 719/317 |
| 2008/0148240 A1 | 6/2008 | Jones et al. | |
| 2008/0155089 A1 | 6/2008 | Hunt et al. | |
| 2008/0163174 A1* | 7/2008 | Krauss | G06F 9/526 |
| | | | 717/127 |
| 2008/0172403 A1 | 7/2008 | Papatla et al. | |
| 2008/0243865 A1* | 10/2008 | Hu | G06F 17/30575 |
| 2008/0307441 A1 | 12/2008 | Kuiper et al. | |
| 2009/0006116 A1 | 1/2009 | Baker et al. | |
| 2009/0007072 A1 | 1/2009 | Singhal et al. | |
| 2009/0007075 A1 | 1/2009 | Edmark et al. | |
| 2009/0049429 A1 | 2/2009 | Greifeneder et al. | |
| 2009/0064148 A1 | 3/2009 | Jaeck et al. | |

(56) References Cited

U.S. PATENT DOCUMENTS

| | | |
|---|---|---|
| 2009/0106601 A1 | 4/2009 | Ngai et al. |
| 2009/0138881 A1* | 5/2009 | Anand .................. G06F 9/5027 718/104 |
| 2009/0150908 A1 | 6/2009 | Shankaranarayanan et al. |
| 2009/0187791 A1 | 7/2009 | Dowling et al. |
| 2009/0193443 A1 | 7/2009 | Lakshmanan et al. |
| 2009/0210876 A1 | 8/2009 | Shen et al. |
| 2009/0216874 A1 | 8/2009 | Thain et al. |
| 2009/0241095 A1 | 9/2009 | Jones et al. |
| 2009/0287815 A1 | 11/2009 | Robbins et al. |
| 2009/0300405 A1 | 12/2009 | Little |
| 2009/0328180 A1 | 12/2009 | Coles et al. |
| 2010/0017583 A1* | 1/2010 | Kuiper ................ G06F 11/3612 712/227 |
| 2010/0088404 A1* | 4/2010 | Mani ...................... H04L 67/02 709/224 |
| 2010/0094992 A1* | 4/2010 | Cherkasova ........ H04L 41/0896 709/224 |
| 2010/0100774 A1 | 4/2010 | Ding et al. |
| 2010/0131931 A1 | 5/2010 | Musuvathi et al. |
| 2010/0131956 A1* | 5/2010 | Drepper ................ G06F 9/5011 718/104 |
| 2010/0138703 A1 | 6/2010 | Bansal et al. |
| 2010/0183007 A1 | 7/2010 | Zhao et al. |
| 2010/0257510 A1* | 10/2010 | Horley ................ G06F 11/3648 717/128 |
| 2010/0262703 A1 | 10/2010 | Faynberg et al. |
| 2010/0268797 A1 | 10/2010 | Pyrik et al. |
| 2010/0312888 A1 | 12/2010 | Alon et al. |
| 2010/0318648 A1 | 12/2010 | Agrawal et al. |
| 2011/0016207 A1 | 1/2011 | Goulet et al. |
| 2011/0016328 A1 | 1/2011 | Qu et al. |
| 2011/0087722 A1 | 4/2011 | Clementi et al. |
| 2011/0088045 A1 | 4/2011 | Clementi et al. |
| 2011/0264790 A1 | 10/2011 | Haeuptle et al. |
| 2012/0117544 A1 | 5/2012 | Kakulamarri et al. |
| 2012/0191893 A1 | 7/2012 | Kuiper et al. |
| 2012/0291113 A1 | 11/2012 | Zapata et al. |
| 2012/0297371 A1 | 11/2012 | Greifeneder et al. |
| 2014/0068067 A1 | 3/2014 | Bansal |
| 2014/0068068 A1 | 3/2014 | Bansal |
| 2014/0068069 A1 | 3/2014 | Bansal |

OTHER PUBLICATIONS

U.S. Appl. No. 13/365,171; Final Office Action mailed Jul. 30, 2014.
U.S. Appl. No. 13/365,171; Office Action mailed Jan. 28, 2014.
U.S. Appl. No. 13/189,360; Office Action mailed Mar. 26, 2014.
U.S. Appl. No. 13/189,360; Final Office Action mailed Aug. 19, 2013.
U.S. Appl. No. 13/189,360; Office Action mailed Jan. 31, 2013.
U.S. Appl. No. 14/071,503; Final Office Action mailed Aug. 28, 2014.
U.S. Appl. No. 14/071,503; Office Action mailed Feb. 3, 2014.
U.S. Appl. No. 14/071,523; Final Office Action mailed Aug. 29, 2014.
U.S. Appl. No. 14/071,523; Office Action mailed Feb. 12, 2014.
U.S. Appl. No. 14/071,525; Final Office Action mailed Aug. 1, 2014.
U.S. Appl. No. 14/071,525; Office Action mailed Jan. 15, 2014.

* cited by examiner

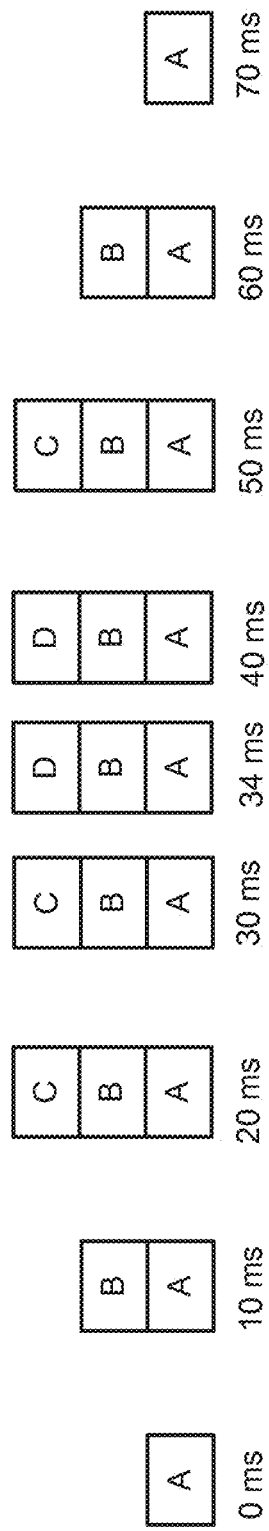

CONDUCTING A DIAGNOSTIC SESSION FOR MONITORED BUSINESS TRANSACTIONS

CROSS-REFERENCE TO RELATED APPLICATIONS

This application is a continuation and claims the priority benefit of U.S. patent application Ser. No. 14/071,525, titled "Conducting a Diagnostic Session for Monitored Business Transactions," filed Nov. 4, 2013, which is a continuation and claims the priority benefit of U.S. patent application Ser. No. 13/189,360, titled "Automatic Capture of Diagnostic Data Based on Transaction Behavior Learning," filed Jul. 22, 2011, now U.S. Pat. No. 8,938,533, which is a continuation-in-part and claims the priority benefit of U.S. patent application Ser. No. 12/878,919, titled "Monitoring Distributed Web Application Transactions," filed Sep. 9, 2010, which claims the priority benefit of U.S. provisional application 61/241,256, titled "Automated Monitoring of Business Transactions," filed Sep. 10, 2009, the disclosure of which is incorporated herein by reference.

BACKGROUND OF THE INVENTION

The World Wide Web has expanded to provide web services faster to consumers. Web services may be provided by a web application which uses one or more services to handle a transaction. The applications may be distributed over several machines, making the topology of the machines that provides the service more difficult to track and monitor.

Monitoring a web application helps to provide insight regarding bottle necks in communication, communication failures and other information regarding performance of the services the provide the web application. When a web application is distributed over several machines, tracking the performance of the web service can become impractical with large amounts of data collected from each machine.

When a distributed web application is not operating as expected, additional information regarding application performance can be used to evaluate the health of the application. Collecting the additional information can consume large amounts of resources and often requires significant time to determine how to collect the information.

There is a need in the art for web service monitoring which may accurately and efficiently monitor the performance of distributed applications which provide a web service.

SUMMARY OF THE CLAIMED INVENTION

The present technology monitors a distributed network application system and may detect an anomaly based the learned behavior of the system. The behavior may be learned for each of one or more machines which implement a distributed business transaction. The present system may automatically collect diagnostic data for one or more business transactions and/or requests based on learned behavior for the business transaction or request. The diagnostic data may include detailed data for the operation of the distributed web application and be processed to identify performance issues for a transaction. Detailed data for a distributed web application transaction may be collected by sampling one or more threads assigned to handle portions of the distributed business transaction. Data regarding the distributed transaction may then be reported from agents monitoring portions of the distributed transaction to one or more central controllers and assembled by one or more controllers into business transactions. Data associated with one or more anomalies may be reported via one or more user interfaces.

Collection of diagnostic data at a server may be initiated locally by an agent or remotely from a controller. An agent may initiate collection of diagnostic data based on a monitored individual request or a history of monitored requests associated with a business transaction. For example, an agent at an application or Java Virtual Machine (JVM) may trigger the collection of diagnostic runtime data for a particular request if the request is characterized as an outlier. The agent may also trigger a diagnostic session for a business transaction or other category of request if the performance of requests associated with the business transaction varies from a learned baseline performance for the business transaction. The agent may determine baselines for request performance and compare the runtime data to the baselines to identify the anomaly. A controller may receive aggregated runtime data reported by the agents, process the runtime data, and determine an anomaly based on the processed runtime data that doesn't satisfy one or more parameters, thresholds or baselines.

In an embodiment, a method for performing a diagnostic session for a request may begin with initiating collection of diagnostic data associated with a request. An application thread on each of two or more servers may be sampled. The application threads may be associated with the same business transaction and the business transaction may be associated with the request. The diagnostic data may be stored.

BRIEF DESCRIPTION OF THE DRAWINGS

FIG. 6B is an illustration of an exemplary thread call stack data over time.

DETAILED DESCRIPTION

Figure 1:
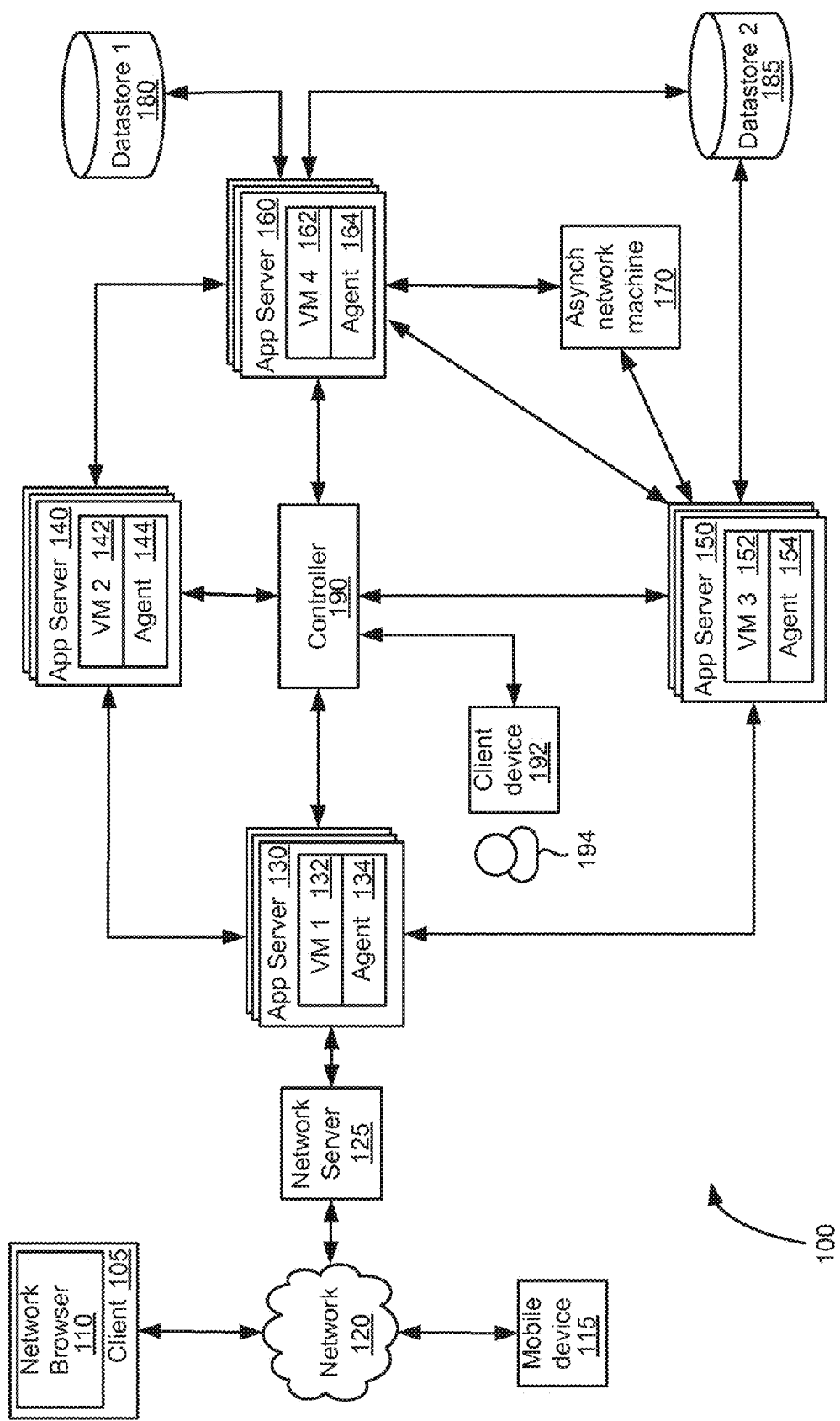
FIG. 1 is a block diagram of an exemplary system for monitoring a distributed application.

The present technology monitors a network or web application provided by one or more distributed applications. The web application may be provided by one or more web services each implemented as a virtual machine or one or more applications implemented on a virtual machine. Agents may be installed on one or more servers at an application level, virtual machine level, or other level. An agent may monitor a corresponding application (or virtual machine) and application communications. Each agent may communicate with a controller and provide monitoring data to the controller. The controller may process the data to learn and evaluate the performance of the application or virtual machine, model the flow of the application, and determine information regarding the distributed web application performance. The monitoring technology determines how each distributed web application portion is operating, establishes a baseline for operation, and determines the architecture of the distributed system.

The present technology may monitor a distributed web application that performs one or more business transactions. A business transaction may be a set of tasks performed by one or more distributed web applications in the course of a service provide over a network. In an e-commerce service, a business transaction may be "add to cart" or "check-out" transactions performed by the distributed application.

The behavior of a system which implements a distributed web transaction may be learned for each of one or more machines which implement the distributed transaction. The behavior may be learned for a business transaction which includes multiple requests and a particular request. The present system may automatically collect diagnostic data for one or more business transactions and/or requests based on learned behavior of the business transaction or request. The diagnostic data may include detailed data for the operation of the distributed web application and be processed to identify performance issues for a transaction. Detailed data for a distributed web application transaction may be collected by sampling one or more threads assigned to handle portions of the distributed business transaction. Data regarding the distributed transaction may then be reported from agents monitoring portions of the distributed transaction to one or more central controllers and assembled by one or more controllers into business transactions. Data associated with one or more anomalies may be reported via one or more user interfaces.

The present technology may perform a diagnostic session for an anomaly detected in the performance of a portion of a distributed web application, such as a business transaction or category of request. During the diagnostic session, detailed data may be collected for the operation of the distributed web application. The data may be processed to identify performance issues for a transaction. Detailed data for a distributed web application transaction may be collected by sampling one or more threads assigned to handle portions of the distributed business transaction. Data regarding the distributed transaction may be reported from one or more agents at an application or Java Virtual Machine (JVM) to one or more controllers. The data may be received and assembled by the one or more controllers into business transactions.

The monitoring system may monitor distributed web applications across a variety of infrastructures. The system is easy to deploy and provides end-to-end business transaction visibility. The monitoring system may identify performance issues quickly and has a dynamical scaling capability across a monitored system. The present monitoring technology has a low footprint and may be used with cloud systems, virtual systems and physical infrastructures.

Agents may communicate with code within virtual machine or an application. The code may detect when an application entry point is called and when an application exit point is called. An application entry point may include a call received by the application. An application exit point may include a call made by the application to another application, virtual machine, server, or some other entity. The code within the application may insert information into an outgoing call or request (exit point) and detect information contained in a received call or request (entry point). By monitoring incoming and outgoing calls and requests, and by monitoring the performance of a local application that processes the incoming and outgoing request, the present technology may determine the performance and structure of complicated and distributed business transactions.

FIG. 1 is a block diagram of an exemplary system for monitoring a distributed web application. The system of FIG. 1 may be used to implement a distributed web application and detect anomalies in the performance of the distributed web application. System 100 of FIG. 1 includes client device 105, mobile device 115, network 120, network server 125, application servers 130, 140, 150 and 160, asynchronous network machine 170, data stores 180 and 185, and controller 190.

Client device 105 may include network browser 110 and be implemented as a computing device, such as for example a laptop, desktop, workstation, or some other computing device. Network browser 110 may be a client application for viewing content provided by an application server, such as application server 130 via network server 125 over network 120. Mobile device 115 is connected to network 120 and may be implemented as a portable device suitable for receiving content over a network, such as for example a mobile phone, smart phone, or other portable device. Both client device 105 and mobile device 115 may include hardware and/or software configured to access a web service provided by network server 125.

Network 120 may facilitate communication of data between different servers, devices and machines. The network may be implemented as a private network, public network, intranet, the Internet, or a combination of these networks.

Network server 125 is connected to network 120 and may receive and process requests received over network 120. Network server 125 may be implemented as one or more servers implementing a network service. When network 120 is the Internet, network server 125 maybe implemented as a web server.

Application server 130 communicates with network server 125, application servers 140 and 150, controller 190. Application server 130 may also communicate with other machines and devices (not illustrated in FIG. 1). Application server 130 may host an application or portions of a distributed application and include a virtual machine 132, agent 134, and other software modules. Application server 130 may be implemented as one server or multiple servers as illustrated in FIG. 1.

Virtual machine 132 may be implemented by code running on one or more application servers. The code may implement computer programs, modules and data structures to implement a virtual machine mode for executing programs and applications. In some embodiments, more than one virtual machine 132 may execute on an application server 130. A virtual machine may be implemented as a Java Virtual Machine (JVM). Virtual machine 132 may perform all or a portion of a business transaction performed by application servers comprising system 100. A virtual machine may be considered one of several services that implement a web service.

Virtual machine 132 may be instrumented using byte code insertion, or byte code instrumentation, to modify the object code of the virtual machine. The instrumented object code may include code used to detect calls received by virtual machine 132, calls sent by virtual machine 132, and communicate with agent 134 during execution of an application on virtual machine 132. Alternatively, other code may be byte code instrumented, such as code comprising an application which executes within virtual machine 132 or an application which may be executed on application server 130 and outside virtual machine 132.

Agent 134 on application server 130 may be installed on application server 130 by instrumentation of object code, downloading the application to the server, or in some other manner. Agent 134 may be executed to monitor application server 130, monitor virtual machine 132, and communicate with byte instrumented code on application server 130, virtual machine 132 or another application on application server 130. Agent 134 may detect operations such as receiving calls and sending requests by application server 130 and virtual machine 132. Agent 134 may receive data from instrumented code of the virtual machine 132, process the data and transmit the data to controller 190. Agent 134 may perform other operations related to monitoring virtual machine 132 and application server 130 as discussed herein. For example, agent 134 may identify other applications, share business transaction data, aggregate detected runtime data, and other operations.

Each of application servers 140, 150 and 160 may include an application and an agent. Each application may run on the corresponding application server or a virtual machine. Each of virtual machines 142, 152 and 162 on application servers 140-160 may operate similarly to virtual machine 132 and host one or more applications which perform at lease a portion of a distributed business transaction. Agents 144, 154 and 164 may monitor the virtual machines 142-162, collect and process data at runtime of the virtual machines, and communicate with controller 190. The virtual machines 132, 142, 152 and 162 may communicate with each other as part of performing a distributed transaction. In particular each virtual machine may call any application or method of another virtual machine.

Controller 190 may control and manage monitoring of business transactions distributed over application servers 130-160. Controller 190 may receive runtime data from each of agents 134-164, associate portions of business transaction data, communicate with agents to configure collection of runtime data, and provide performance data and reporting through an interface. The interface may be viewed as a web-based interface viewable by mobile device 115, client device 105, or some other device. In some embodiments, a client device 192 may directly communicate with controller 190 to view an interface for monitoring data.

Asynchronous network machine 170 may engage in asynchronous communications with one or more application servers, such as application server 150 and 160. For example, application server 150 may transmit several calls or messages to an asynchronous network machine. Rather than communicate back to application server 150, the asynchronous network machine may process the messages and eventually provide a response, such as a processed message, to application server 160. Because there is no return message from the asynchronous network machine to application server 150, the communications between them are asynchronous.

Data stores 180 and 185 may each be accessed by application servers such as application server 150. Data store 185 may also be accessed by application server 150. Each of data stores 180 and 185 may store data, process data, and return queries received from an application server. Each of data stores 180 and 185 may or may not include an agent.

Figure 2:
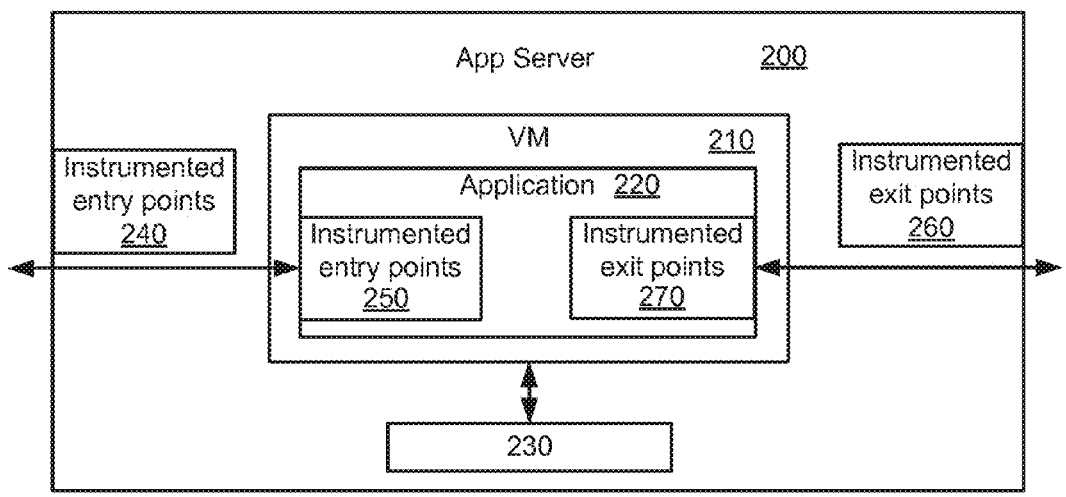
FIG. 2 is a block diagram of an exemplary application server.

FIG. 2 is a block diagram of an exemplary application server 200. The application server in FIG. 2 provides more information for each application server of system 100 in FIG. 1. Application server 200 of FIG. 2 includes a virtual machine 210, application 220 executing on the virtual machine, and agent 230. Virtual machine 210 may be implemented by programs and/or hardware. For example, virtual machine 134 may be implemented as a JAVA virtual machine. Application 220 may execute on virtual machine 210 and may implement at least a portion of a distributed application performed by application servers 130-160. Application server 200, virtual machine 210 and agent 230 may be used to implement any application server, virtual machine and agent of a system such as that illustrated in FIG. 1.

Application server 200 and application 220 can be instrumented via byte code instrumentation at exit and entry points. An entry point may be a method or module that accepts a call to application 220, virtual machine 210, or application server 200. An exit point is a module or program that makes a call to another application or application server. As illustrated in FIG. 2, an application server 200 can have byte code instrumented entry points 240 and byte code instrumented exit points 260. Similarly, an application 220 can have byte code instrumentation entry points 250 and byte code instrumentation exit points 270. For example, the exit points may include calls to JDBC, JMS, HTTP, SOAP, and RMI. Instrumented entry points may receive calls associated with these protocols as well.

Agent 230 may be one or more programs that receive information from an entry point or exit point. Agent 230 may process the received information, may retrieve, modify and remove information associated with a thread, may access, retrieve and modify information for a sent or received call, and may communicate with a controller 190. Agent 230 may be implemented outside virtual machine 210, within virtual machine 210, and within application 220, or a combination of these.

Figure 3A:
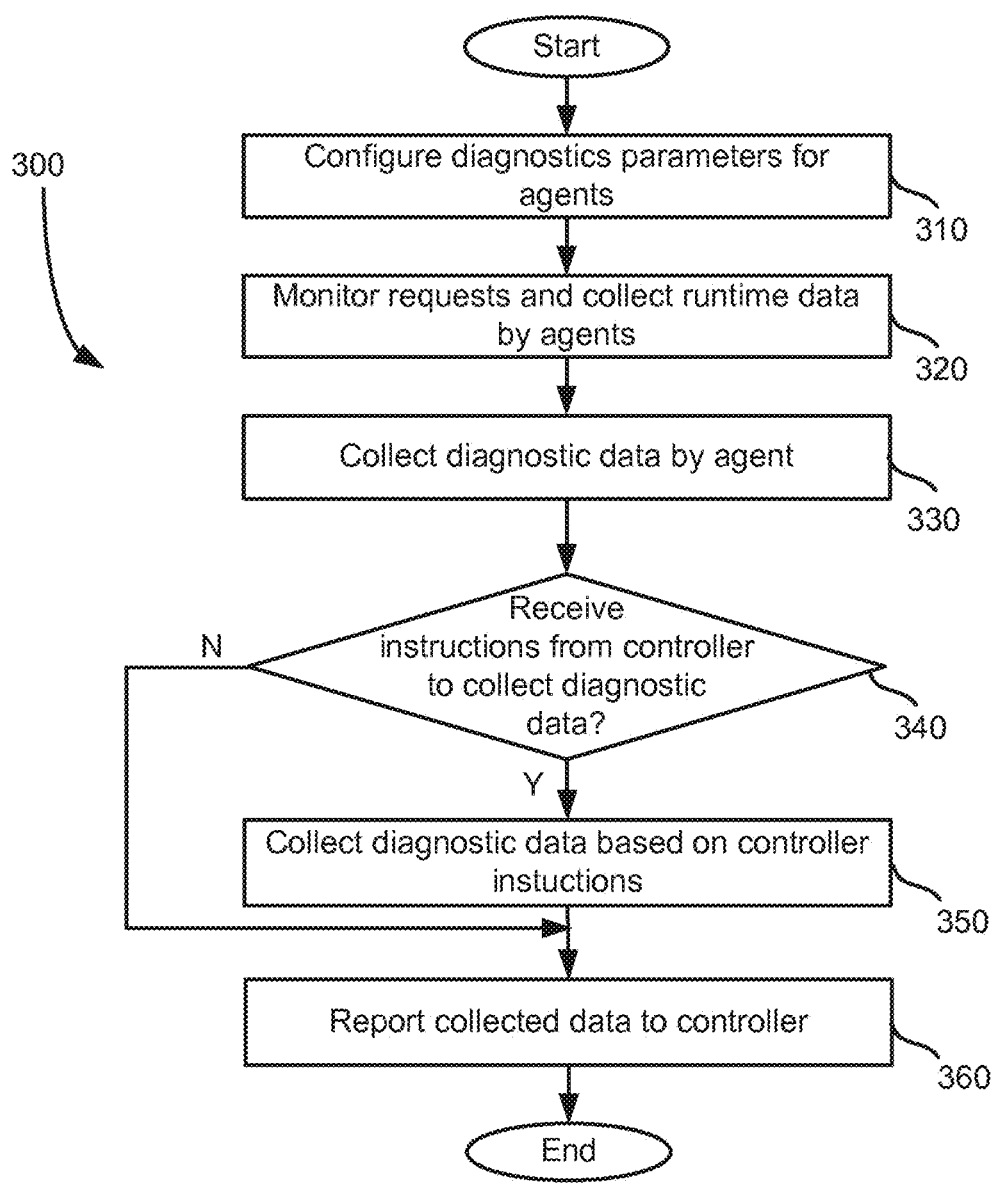
FIG. 3A is a flow chart of an exemplary method for performing a diagnostic session for a distributed web application transaction.

FIG. 3A is a flow chart of an exemplary method for performing a diagnostic session for a distributed web application transaction. The method of FIG. 3 may be performed for a web transaction that is performed over a distributed system, such as the system of FIG. 1.

Diagnostic parameters may be configured for one or more agents at step 310. The diagnostic parameters may be used to implement a diagnostic session conducted for a distributed web application business transaction. The parameters may be set by a user, an administrator, may be pre-set, or may be permanently configured.

Examples of diagnostic parameters that may be configured include the number of transactions to simultaneously track using diagnostic sessions, the number of transactions tracked per time period (e.g., transactions tracked per minute), the time of a diagnostic session, a sampling rate for a thread, a threshold percent of requests detected to run slow before triggering an anomaly, outlier information, and other data. The number of transactions to simultaneously track using diagnostic sessions may indicate the number of diagnostic sessions that may be ongoing at any one time. For example, a parameter may indicate that only 10 different diagnostic sessions can be performed at any one time. The time of a diagnostic session may indicate the time for which a diagnostic session will collect detailed data for operation of a transaction, such as for example, five minutes. The sampling rate of a thread may be automatically set to a sampling rate to collect data from a thread call stack based on a detected change in value of the thread, may be manually configured, or otherwise set. The threshold percent of requests detected to run slow before triggering an anomaly may indicate a number of requests to be detected that run at less than a baseline threshold before triggering a diagnostic session. Diagnostic parameters may be set at either a controller level or an individual agent level, and may affect diagnostic tracking operation at both a controller and/or an agent.

Requests may be monitored and runtime data may be collected at step 320. As requests are received by an application and/or JVM, the requests are associated with a business transaction by an agent residing on the application or JVM, and may be assigned a thread within a thread pool by the application or JVM itself. The business transaction is associated with the thread by adding business transaction information, such as a business transaction identifier, to the thread by an agent associated with the application or JVM that receives the request. The thread may be configured with additional monitoring parameter information associated with a business transaction. Monitoring information may be passed on to subsequent called applications and JVMs that perform portions of the distributed transaction as the request is monitored by the present technology.

Diagnostic data is collected by an agent at step 330. Diagnostic data may be collected for one or more transactions or requests. Diagnostic data may be collected based on the occurrence of an outlier or an anomaly. Collecting diagnostic data is discussed in more detail below with respect to FIG. 3B.

A determination is made as to whether instructions have been received from a controller to collect diagnostic data at step 340. A diagnostic session may be triggered "centrally" by a controller based on runtime data received by the controller from one or more agents located throughout a distributed system being monitored. If a controller determines that an anomaly is associated with a business transaction, or portion of a business transaction for which data has been reported to the controller, the controller may trigger a diagnostic session and instruct one or more agents residing on applications or JVMs that handle the business transaction to conduct a diagnostic session for the distributed business transaction. Operation of a controller is discussed in more detail below with respect to the method of FIG. 9A.

If no instructions are received from a controller to collect diagnostic data, the method of FIG. 3 continues to step 360. If instructions are received from a controller to collect diagnostic data, diagnostic data is collected based on the controller instructions at step 350. An agent receiving the instructions may collect data for the remainder of the current instance of a distributed application as well as subsequent instances of the request. Collecting diagnostic data based on instructions received by a controller is described below with respect to the method of FIG. 5. Next, data collected by a particular agent is reported to a controller at step 360. Each agent in a distributed system may aggregate collected data and send data to a controller. The data may include business transaction name information, call chain information, the sequence of a distributed transaction, and other data, including diagnostic data collected as part of a diagnostic session involving one or more agents.

Figure 3B:
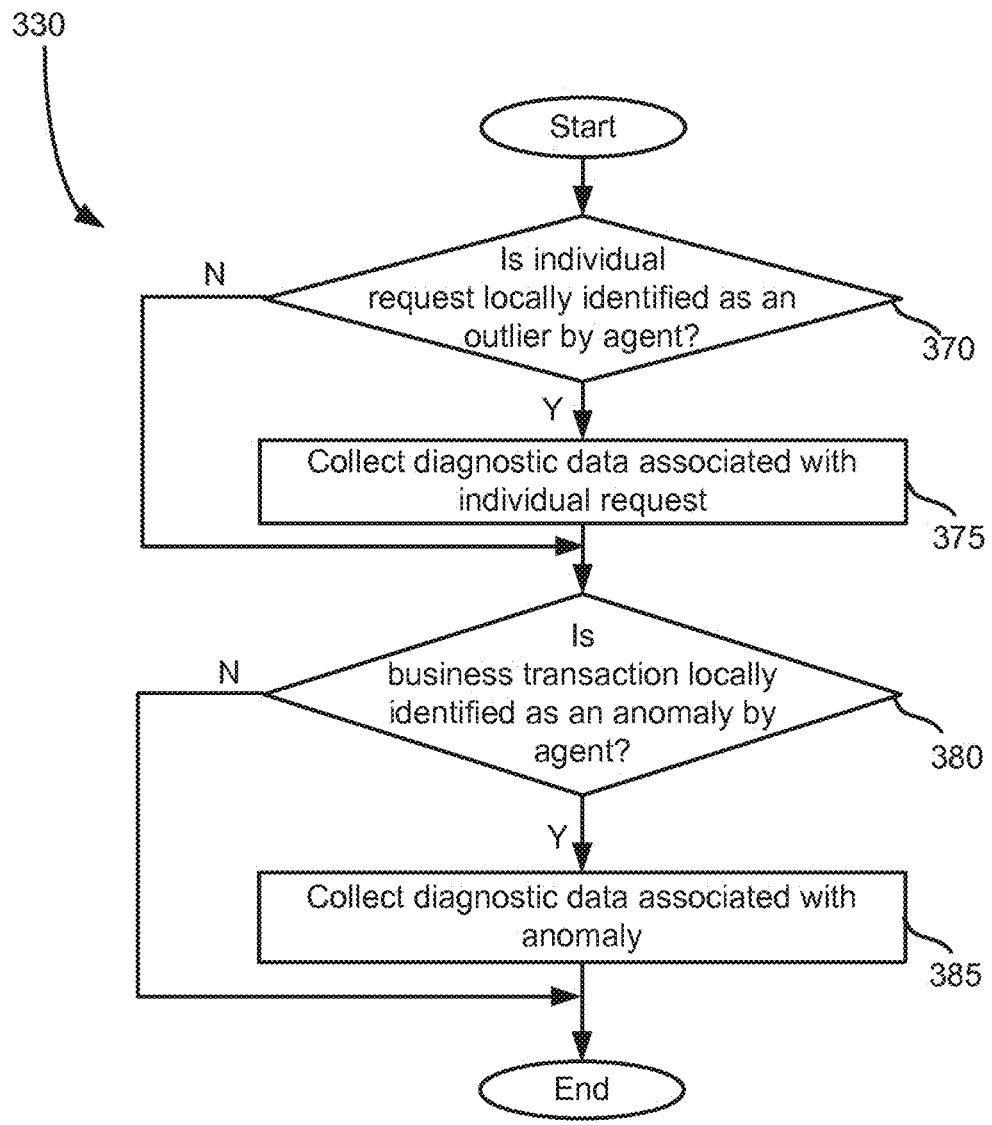
FIG. 3B is a flow chart of an exemplary method for collecting diagnostic data.

FIG. 3B is a flow chart of an exemplary method for collecting diagnostic data. The method of FIG. 3B provides more detail for step 330 of the method of FIG. 3A. A determination is made as to whether an individual request is locally identified as an outlier by an agent at step 370. The identification may be determined based on runtime data collected for the particular request. An outlier may be identified as a request having a characteristic that satisfies a certain threshold. For example, an outlier may have a response time, or time of completion, that is greater than a threshold used to identify outliers. The threshold may be determined based on an average and a standard deviation for the request characteristic. For example, the average time for a request to complete may be 200 milliseconds, and the standard deviation may be 20 milliseconds. A request having a duration within the standard deviation of the average may be considered normal, a request outside the standard deviation but within a range of twice the standard deviation may be considered slow, and a request having a duration outside twice the standard deviation from the average may be considered an outlier.

If the request is locally identified locally as an outlier at step 370, a diagnostic data (i.e., detailed data regarding the request) associated with the particular request associated with the outlier is collected at step 375. Diagnostic data may be collected by sampling a thread call stack for the thread that is locally handling the request associated with the outlier. The agent may collect data for the remainder of the request duration. After collecting diagnostic data, the method of FIG. 3B continues to step 380. If the request is not identified locally as an anomaly, the method of FIG. 3 continues at step 380.

A determination is made as to whether a business transaction is locally identified as an anomaly at step 380. A business transaction may be locally identified as an anomaly by an agent that resides on an application or JVM and processes runtime data associated with the business transaction. The agent may identify the anomaly based on aggregated abnormal behavior for the business transaction, such as an increase in the rate of outliers for the business transaction. For example, if the business transaction has a higher rate of outliers in the last ten minutes than a learned baseline of outliers for the previous hour for the business transaction, the agent may identify the corresponding business transaction performance as an anomaly and trigger a diagnostic session to monitor the business transaction. Identifying a business transaction as an anomaly is discussed in more detail below with respect to the method of FIG. 4.

If the business transaction is identified locally as an anomaly at step 380, a diagnostic session is triggered and diagnostic data associated with the anomalous business transaction is collected at step 385. Diagnostic data may be collected by sampling a thread call stack for the thread that is locally handling one or more requests that form the business transaction that triggered the diagnostic session. The agent may collect data for future occurrences of the business transaction. Outgoing calls associated with the monitored transaction may be monitored to initiate called applications to perform collect diagnostic data as part of the diagnostic session for the transaction. Collecting diagnostic data associated with an anomaly is discussed in more detail below with respect to FIG. 5. After collecting diagnostic data, the method of FIG. 3B ends. If the request is not identified locally as an anomaly, the method of FIG. 3B ends.

Figure 4:
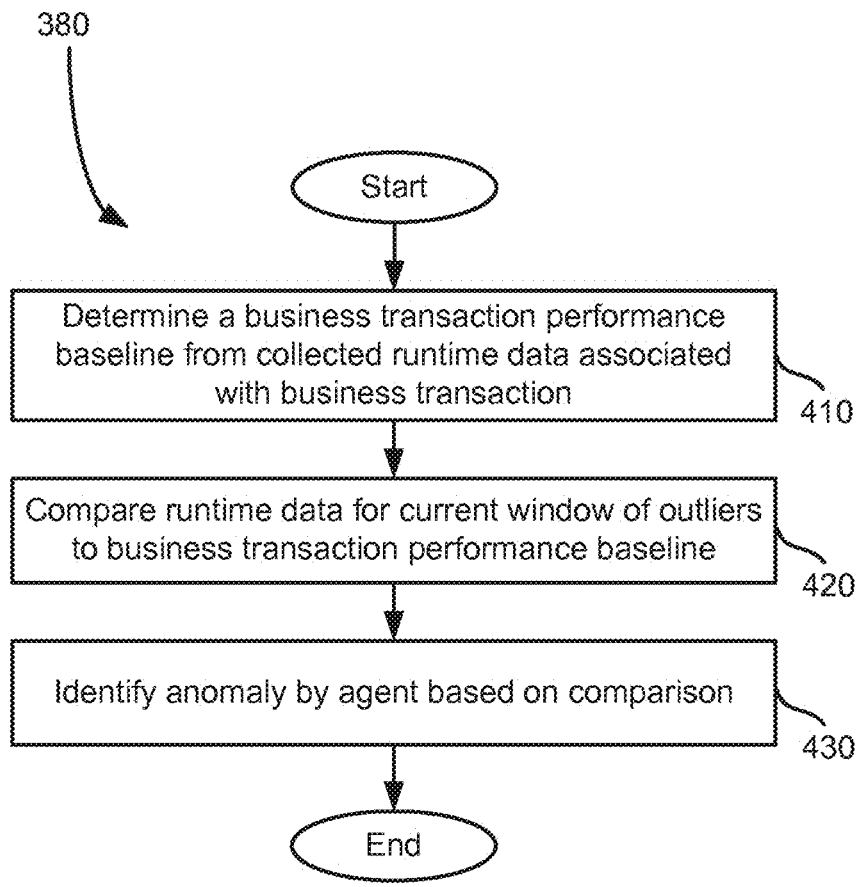
FIG. 4 is a flow chart of a method for locally identifying an anomaly.

FIG. 4 is a flow chart of an exemplary method for locally identifying an anomaly for a business transaction. The method of FIG. 4 may be performed by an agent, such as agent 134, 144, 164 or 154, and may provide more detail for step 380 of the method of FIG. 3B. Locally identifying an anomaly may begin with determining a business transaction performance baseline from collected runtime data at step 410. The runtime data may include the time for an application or JVM to complete a business transaction. The performance baseline may be for a rate of outliers which occur for the business transaction for a period of time. The performance baseline may be determined for the particular machine, or virtual machine (such as a Java Virtual Machine) on which the agent is monitoring data.

A performance baseline may be determined automatically and continuously by an agent. The moving average may be associated with a particular window, such as one minute, ten minutes, or an hour, the time of day, day of the week, or other information to provide a context which more accurately describes the typical performance of the system being monitored. For example, baselines may be determined and updated for transactions occurring within a specific time range within a day, such as 11:00 AM to 2:00 PM. The baseline may be, for example, a moving average of the time to perform a request, the number of outliers occurring, or other data collected during the particular baseline window. For purposes of discussion, a baseline is discussed with respect to a rate of outliers occurring for a business transaction within a time window at a particular machine.

In some embodiments, a standard deviation may be automatically determined by the agent, controller, or other source and used to identify an anomaly. For example, a baseline may be determined from an average response time of one second for a particular transaction. The standard deviation may be 0.3 seconds. As such, a response time of 1.0-1.3 seconds may be an acceptable time for the business transaction to occur. A response time of 1.3-1.6 seconds may be categorized as "slow" for the particular request, and a response time of 1.6-1.9 seconds may be categorized as very slow and may be identified as an anomaly for the request. An anomaly may also be based on a number requests having a response time within a particular derivative range. For example, an anomaly may be triggered if 15% or more of requests have performed "slow", or if three or more instances of a request have performed "very slow."

The runtime data collected for current outliers is compared to the business transaction performance baseline at step 420 by the particular agent. For example, the number of outliers occurring for a business transaction in the time window is compared to the baseline of outlier occurrence for the business transaction.

An anomaly may be identified by the agent based on the comparison at step 430. For example, if an agent detects that the number of outliers that occurred for a business transaction within a the past ten minutes is greater than the baseline outlier rate for the business transaction, the agent may identify an anomaly.

Figure 5:
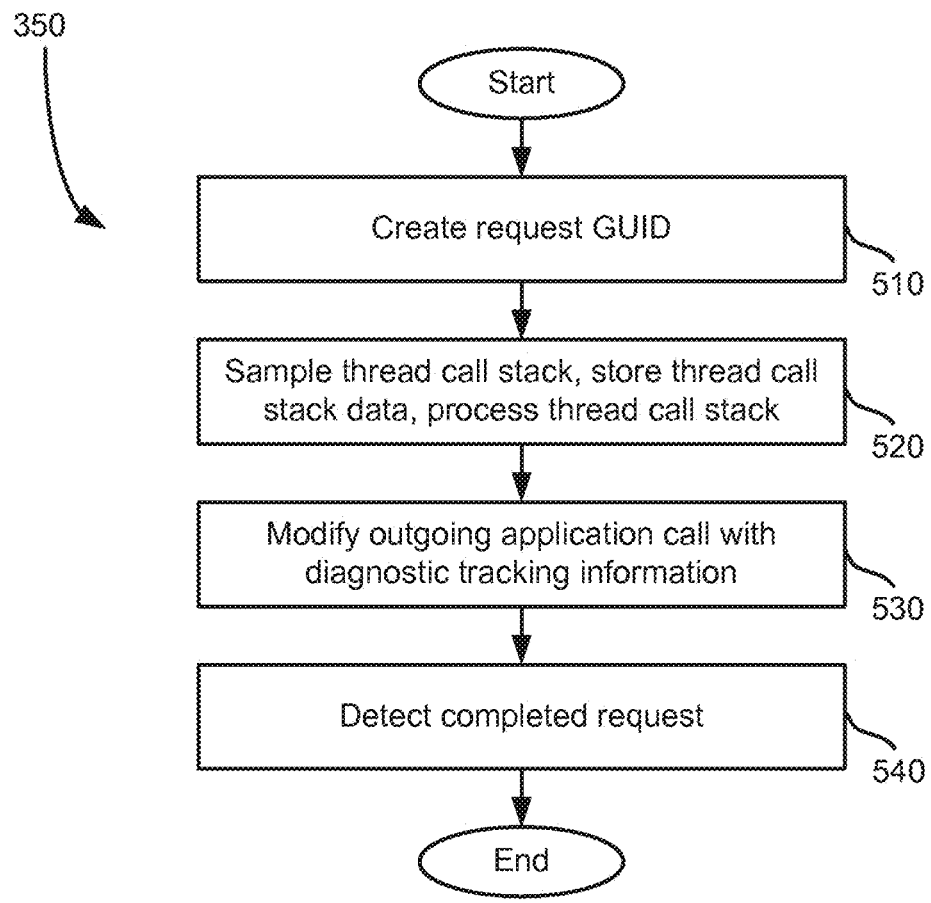
FIG. 5 is a flow chart of an exemplary method for collecting diagnostic data.

FIG. 5 is a flow chart of an exemplary method for collecting diagnostic data. The method of FIG. 5 may provide more detail for step 350 of the method of FIG. 3A. A request global unique identifier (GUID) may be created and associated with the request at step 510. The request GUID may be generated locally by an agent or remotely by a controller. When generated by a controller, the agent may create a temporary identifier for the anomaly, report the temporary identifier to the controller, and then receive the diagnostic session GUID to use subsequently to identify the anomaly.

A thread call stack may be sampled, stored and processed at step 520. The thread assigned to handle a request may be sampled to determine what the thread is presently handling for the request. The thread call stack data received from the sampling may be stored for later processing for the particular distributed web transaction. Sampling and storing a thread call stack is discussed in more detail below with respect to the method at FIG. 6A.

An outgoing application call may be modified with diagnostic tracking information at step 530. When a call to an outside application is detected, the call may be modified with diagnostic information for the receiving application. The diagnostic information may include the diagnostic session GUID and other data. Modifying an outgoing application call with diagnostic tracking information is discussed in more detail with respect to the method at FIG. 7.

A completed request is detected at step 540. At the completion of the request, data for the request associated with the anomaly may be stored by the agent and eventually sent to a controller. The diagnostic session may be continued for a period of time specified in a corresponding diagnostic parameter for the agent.

Figure 6A:
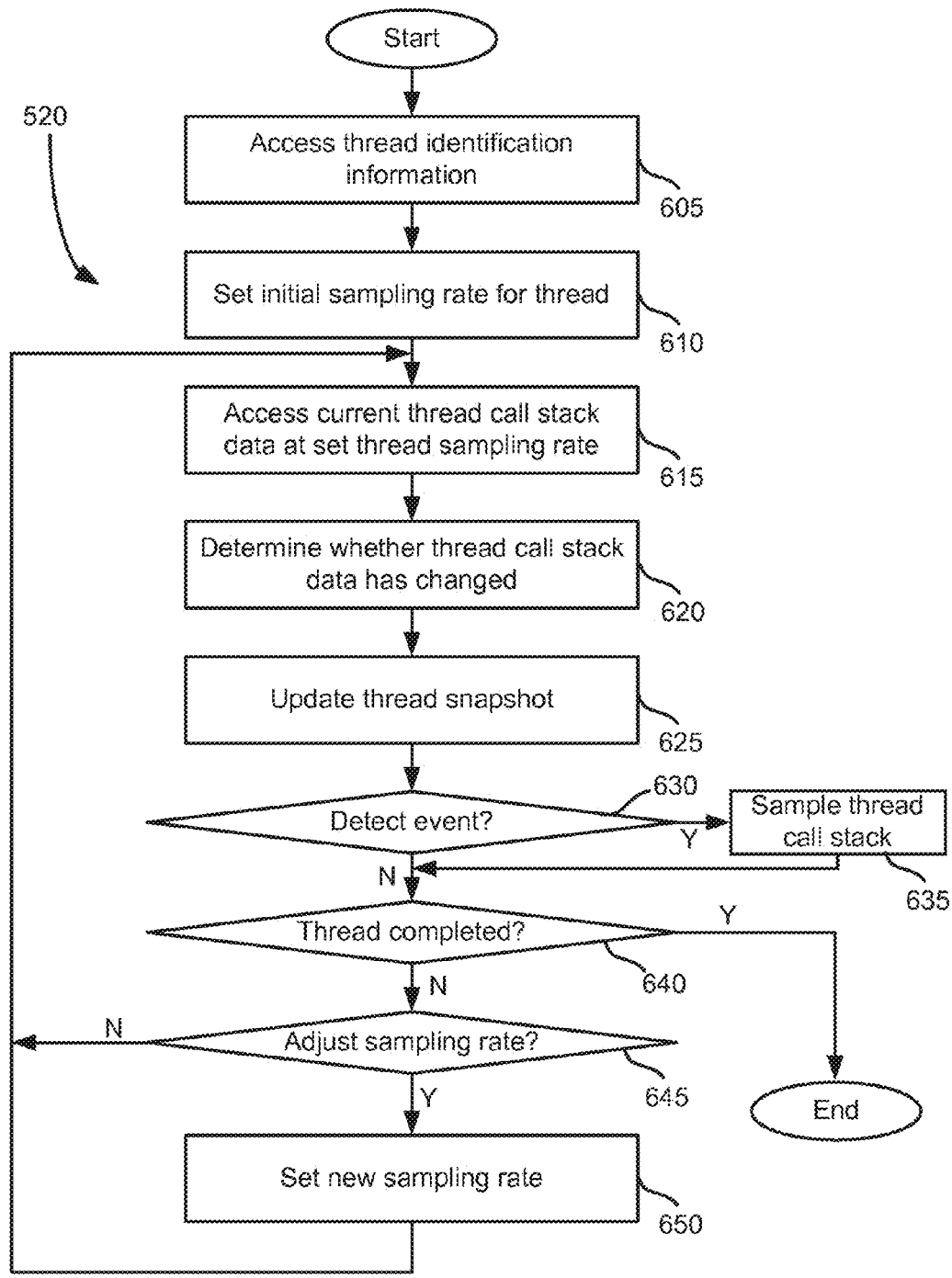
FIG. 6A is a flow chart of an exemplary method for sampling a thread.

FIG. 6A is a flow chart of an exemplary method for sampling a thread. The method of FIG. 6A may provide more detail for step 520 of the method of FIG. 5. Thread identification information may be accessed at step 605. The thread identification information may be accessed from a JVM or application server that manages the thread pool from which a thread was selected to handle a request associated with the anomaly.

An initial sampling rate for the thread may be set at step 610. The initial sampling rate may be set to a default rate, for example a rate of every 10 milliseconds.

The current thread call stack is accessed at the set thread sampling rate at step 615. Sampling the thread call stack may detect what the thread is currently doing. For example, sampling the thread call stack may reveal that the thread is currently processing a request, processing a call to another application, executing an EJB, or performing some other process. The thread call stack may be sampled and the sampled data may be stored locally by the agent sampling the stack.

After sampling of the thread call stack, the agent may determine whether the thread call stack data retrieved as a result of the sampling has changed at step 620. The change is determined by the agent by comparing the most recent call stack data to the previous call stack data. A thread snapshot is updated at step 640 based on the most recent sampling. The snapshot indicates what the thread call stack has performed. An example of a call stack is discussed below with respect to the interface of FIG. 11. The update may be based on calls, requests, or timelines identified from the sampling.

A thread snapshot is updated at step 625. The thread snapshot is updated to indicate changes to the thread call stack. A determination is made at step 630 to determine if an event has been detected at step 630. The event may be the expiration of a period of time (for example, based on thread sampling rate), the detection of a new request made by a thread, or some other event. If an event is detected, the thread call stack is sampled at step 635 and the method of FIG. 6A continues to step 640. If no event is detected, the method of FIG. 6A continues to step 640.

A determination is made at step 640 as to whether the thread has completed at step 640. If the thread is complete, the method of FIG. 6A ends. If the thread is not complete, a determination is made as to whether the thread sampling rate should be adjusted. In some embodiments, the sampling rate may be adjusted after a period of time, for example every two minutes. If the sampling rate is determined not to be adjusted at step 645, the method of FIG. 6A continues to step 615. If the sampling rate is adjusted, the new sampling rate is set at step 650 and the method continues to step 615. The sampling rate may be adjusted to save processing cycles and resources after a set period of time.

FIG. 6B is an illustration of an exemplary thread call stack data representation over time. The method of FIG. 6B indicates exemplary states of a thread call stack sampled at different times. Each state includes a snapshot of data in the call stack at the corresponding sampling times. For example, for a sampling at time of 0 milliseconds (ms), the call stack indicates that an initial request A is being executed. At a time of 10 ms, the thread call stack indicates that the thread is executing a request to an application B. As such, it can be inferred that request A has made a call to application B. At a time of 20 ms, the thread call stack indicates that application B has called application C. At a time of 30 ms, there is no change in the stack.

At a time of 34 ms, a call to D may be detected. As a result, the thread call stack may be sampled as a result of detecting the call at a time of 34 ms. Hence, a thread call stack may be sampled in response to detecting a call in addition to periodically.

At a time of 40 ms in FIG. 6B, the thread call stack indicates that application C is no longer present at the top of the stack. Rather, application D has been called by application B. The agent sampling the call stack may determine from this series of thread call stack data that application C executed for 20 ms and that application B called application D after calling application C. At a time of 50 ms, there is no change in the call stack.

At a time of 60 ms, application D has completed and application B has again called application C. An agent processing the thread call stack data may determine that application D executed for 20 ms, and application B called C a second time. The second call to application C may be represent a sequence of calls to application C (one at 20 ms sampling, and one at 60 ms sampling). The present technology may differentiate between each call to application C as part of the request. At 70 ms in time, application C has completed, corresponding to an execution of 10 milliseconds for the second call to application C. At a time of 80 ms, B has completed, corresponding to an execution time of 70 milliseconds for application B.

Figure 7:
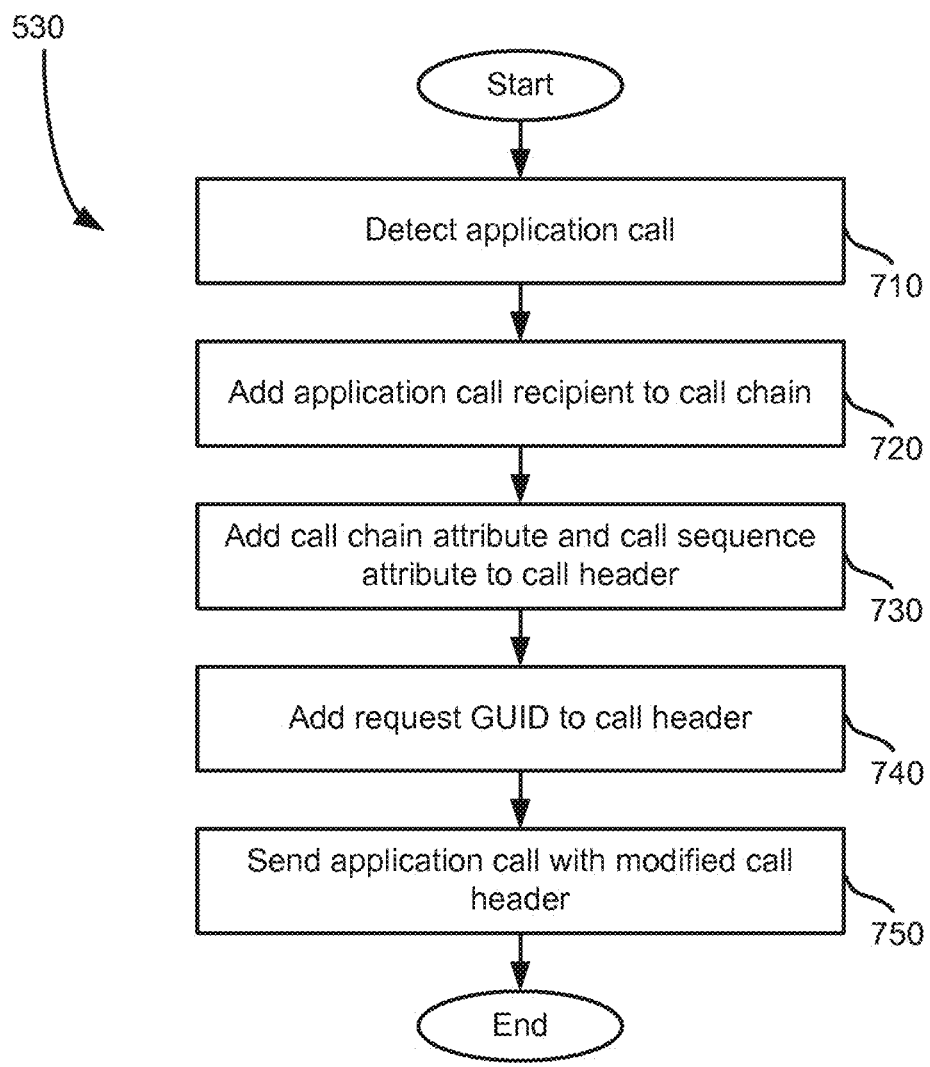
FIG. 7 is a flow chart of an exemplary method for modifying an application call.

FIG. 7 is a flow chart of an exemplary method for modifying an application call. The method of FIG. 7 may provide more detail for step 530 of the method of FIG. 5 and may be performed by an agent located at an application or JVM that is calling the application.

First, an application call is detected at step 710. The application call may be detected by sampling a thread call stack associated with the thread handling a request being monitored.

The application call recipient may be added to a call chain at step 720. Once the call is detected at step 710, information regarding the call can be accessed from the thread call stack, including the recipient of the detected call. The call recipient may be added to a call chain maintained in the thread being monitored. The call chain may include call sequence information if more than one call is made to a particular application as part of processing a request locally.

The call chain attribute and call sequence attribute may be added to the call header at step 730. A diagnostic session GUID may be added to the call header at step 740. An application receives the call with a diagnostic session GUID, and an agent at the receiving application detects the diagnostic session GUID. The agent on the receiving application may then monitor the thread processing the received call, associated collected data with the particular diagnostic session GUID, and report the data to a controller. The application call may then be sent with the modified call header to an application at step 750.

Figure 8:
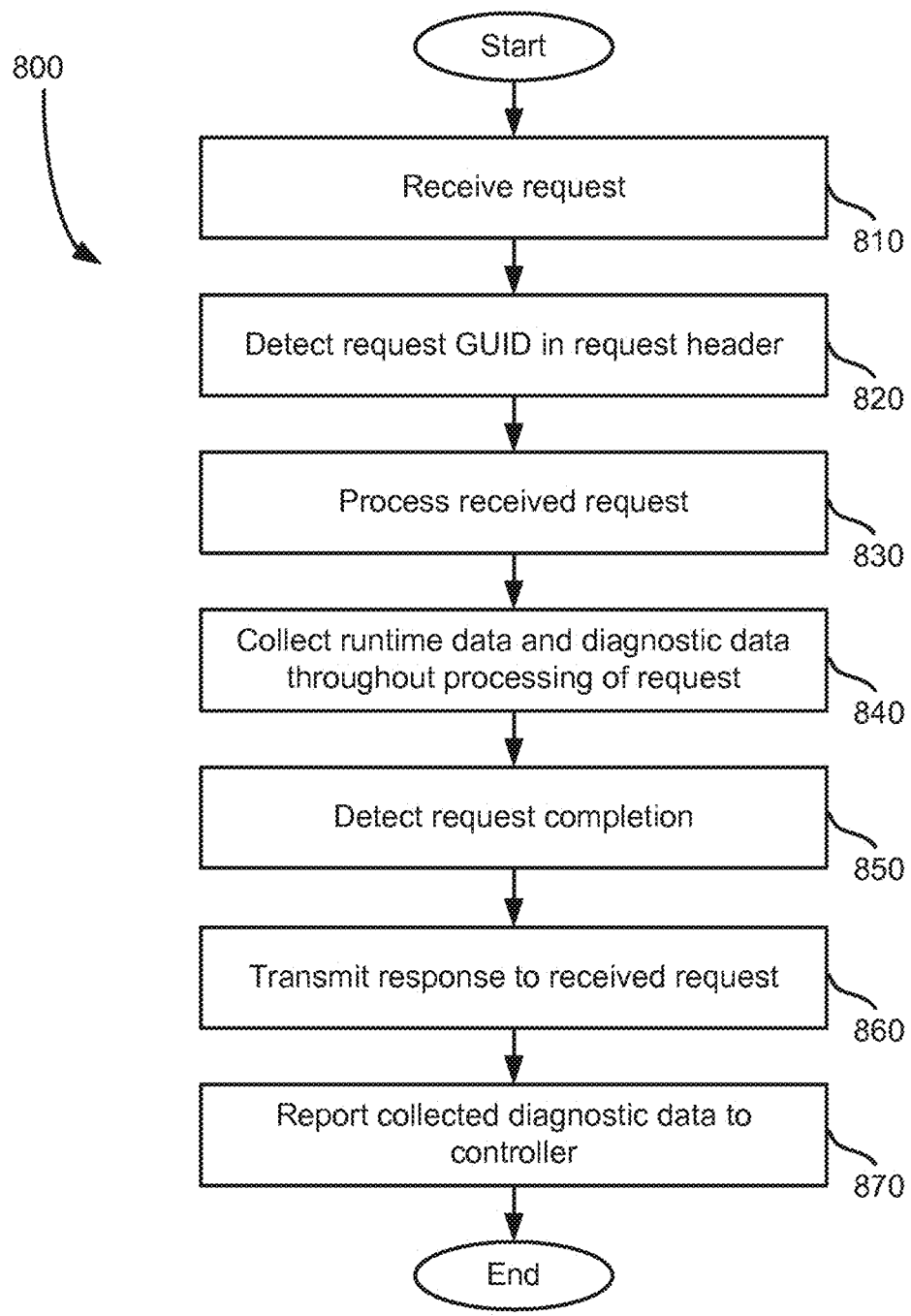
FIG. 8 is a flow chart of an exemplary method for processing a received request.

FIG. 8 is a flow chart of an exemplary method for processing a received request. The method of FIG. 8 may be performed by an application which receives a request sent with a modified call header from an application collecting data as part of a diagnostics session. For example, the method of FIG. 8 describes how an application processes the received call that is originated by the application call of step 750.

A request is received by the application at step 810. An agent may detect a request GUID in the request header at step 820. The request GUID may indicate an identifier for a diagnostic session currently underway for a distributed transaction that includes the particular request. The received request may be performed and monitored at step 830. Runtime data, including diagnostic data, may be collected throughout processing of the request at step 840. The request's completion is detected at step 850, and a response to the received request is generated and transmitted to the requesting application at step 860. Eventually, collected runtime data including diagnostic data and other data associated with the request may be reported to a controller at step 870.

Figure 9A:
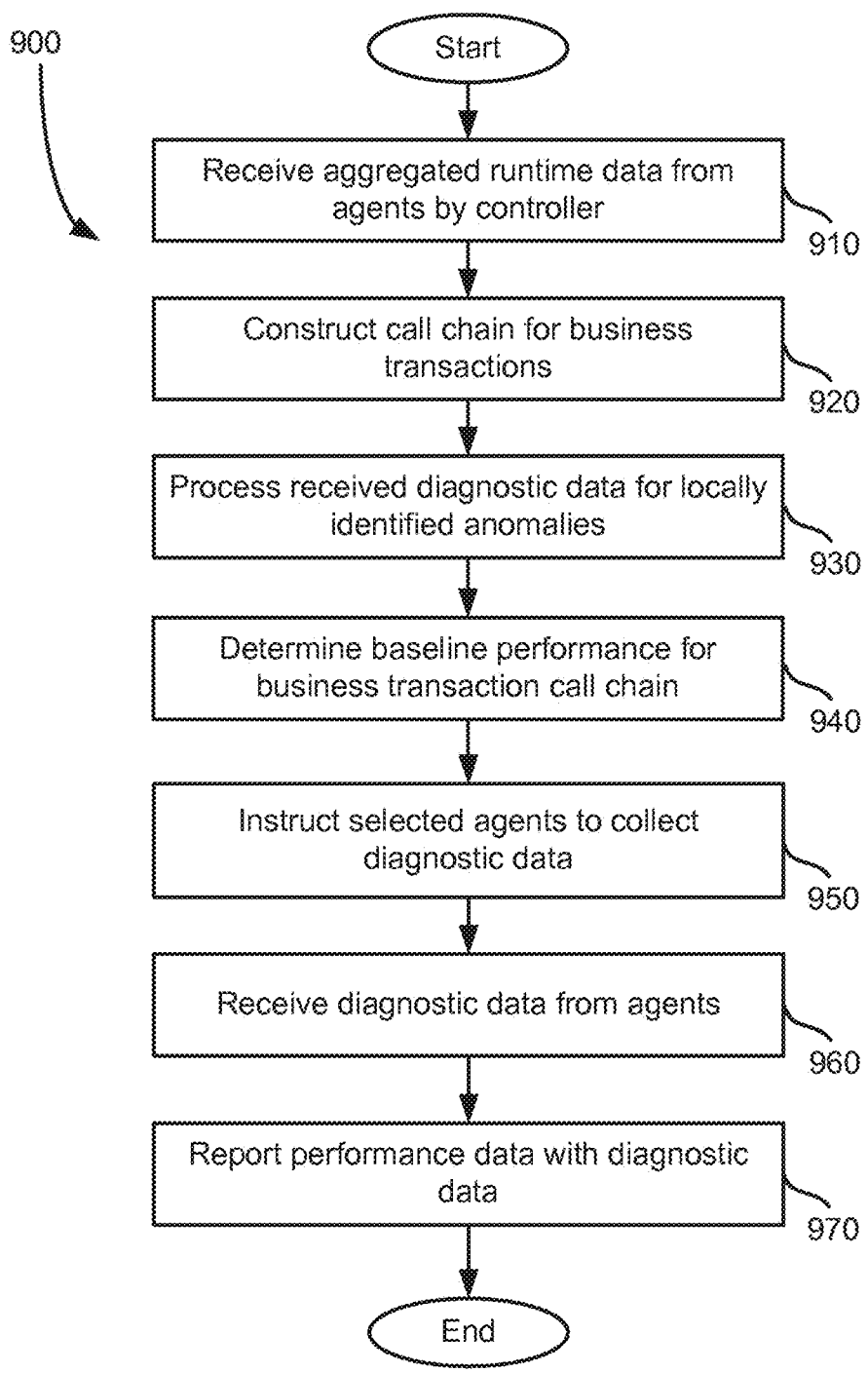
FIG. 9A is a flow chart of an exemplary method for controller operation.

FIG. 9A is a flow chart of an exemplary method for controller operation. The method of FIG. 9 may be performed by control 190. Aggregated runtime data may be received from one or more agents by a controller at step 910. The aggregated runtime data may include diagnostic data generated in response to triggering one or more diagnostic sessions.

A call chain may be constructed for each business transaction at step 920. The call chain is constructed from the aggregated runtime data. For example, transactions may be pieced together based on request GUIDs and other data to build a call chain for each business transaction. Received diagnostic data for locally identified anomalies may be processed by the controller at step 930. Processing the diagnostic data may include determining the response times for portions of a distributed business transaction as well as the transaction as a whole, identifying locally detected anomalies, and other processing. Baseline performance for a business transaction call chain is determined at step 940. The baseline performance may be determined based on past performance for each business transaction and portions thereof, including for example each request that is made as part of a business transaction.

Selected agents associated with the applications and JVMs that perform the transaction associated with the anomaly are instructed to collect diagnostic data based on diagnostic parameters at step 950. The diagnostic data may be collected as part of a diagnostic session already triggered by an agent (locally determined anomaly) or triggered by the controller. In some embodiments, the controller may determine whether the maximum number of diagnostic sessions is already reached, and if so may place the presently detected diagnostic session in a queue for execution as soon as a diagnostic session is available.

Diagnostic data is received from selected agents collecting data as part of the diagnostic session at step 960. Performance data is generated from the collected diagnostic data received from one or more agents, and the performance data may be reported by the controller at step 970. The performance data may be reported via one or more interfaces, for example through an interface discussed in more detail with respect to FIGS. 10-12.

Figure 9B:
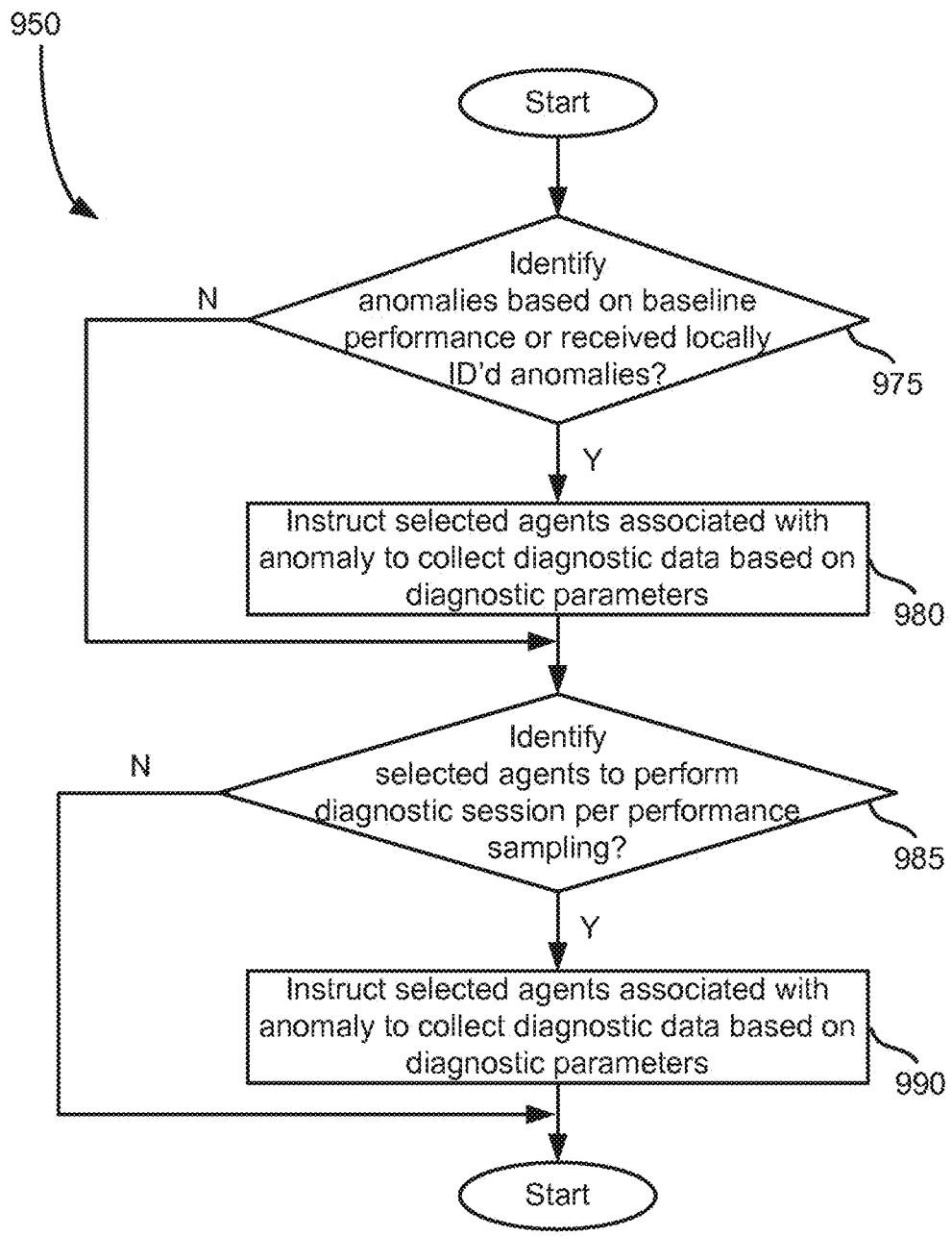
FIG. 9B is a flow chart of an exemplary method for instructing agents by a controller.

FIG. 9B is a flow chart of an exemplary method for instructing agents by a controller. A determination is made as to whether any anomalies are identified by the controller based on baseline performance or received locally identified anomalies at step 975. If no anomaly is detected, the method continues to step 985. If an anomaly is detected, selected agents associated with the anomaly are instructed to collect diagnostic data based on diagnostic parameters at step 980. The method then continues to step 985.

A determination is made as to whether selected agents are identified to perform a diagnostic session per performance sampling at step 985. If no agents are identified, the method ends. If one or more agents are selected, the selected agents are instructed to collect diagnostic data based on the diagnostic parameters.

Figure 10:
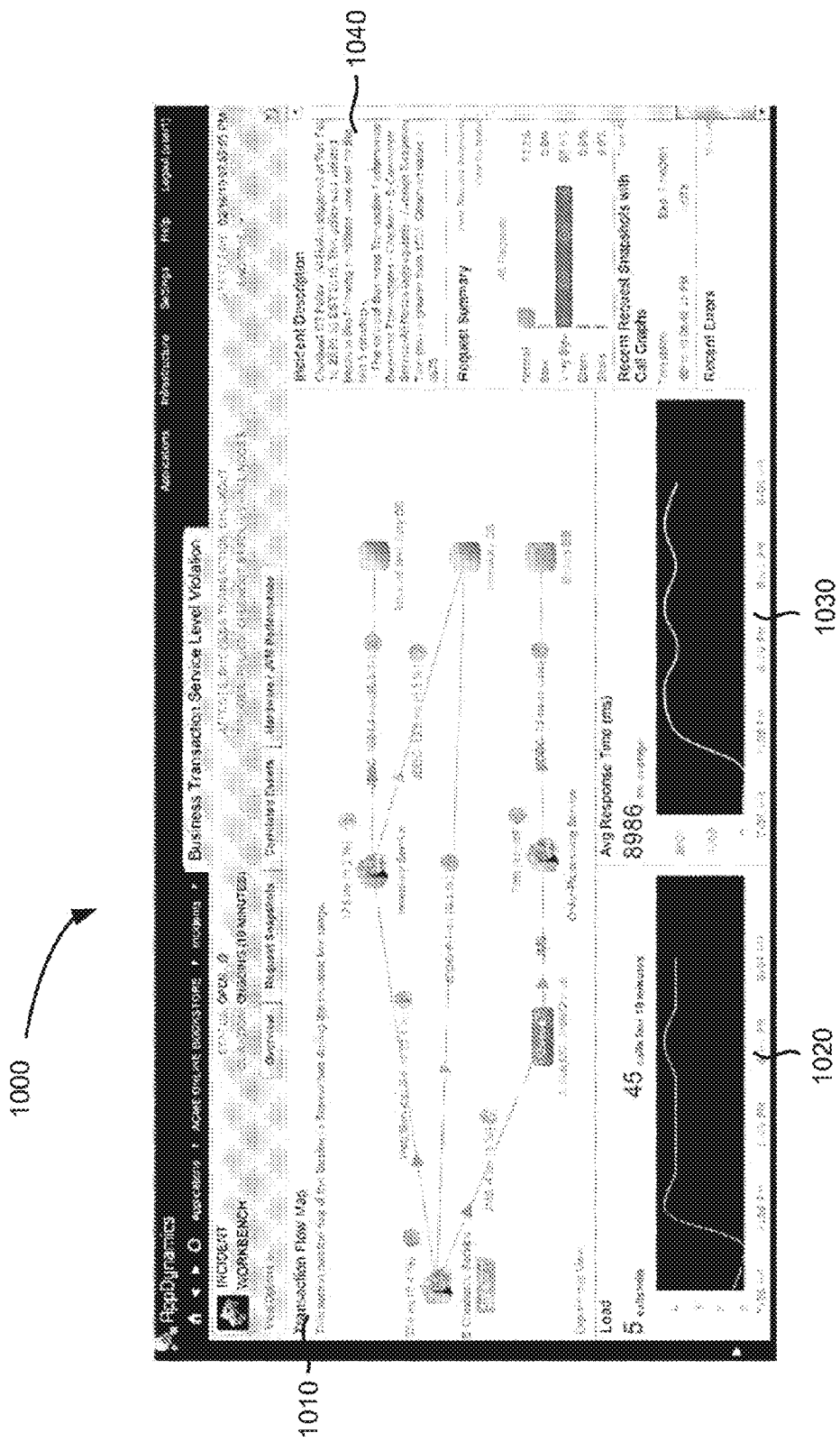
FIG. 10 is an exemplary interface providing a transaction flow map.

During a diagnostic session, deep diagnostic data may be retrieved for one or more distributed business transactions associated with a diagnostic session which are performed by one or more applications or JVMs. FIGS. 10-12 illustrate exemplary interfaces for displaying information associated with a diagnostic session.

FIG. 10 is an exemplary interface providing a transaction flow map. Interface 1000 in FIG. 10 includes a transaction flow map frame 1010, a load information frame 1020, average response time frame 1030, incident description frame 1040, and request summary frame. Transaction flow map frame 1010 provides a map of the applications or JVMs that comprise the distributed web transaction associated with a diagnostic session triggered by an anomaly. The upper portion of frame 1010 indicates the status of the anomaly request, the duration, the name of the business transaction, a triggering policy, a start time, an end time, and may include other additional data. The status of the request is "open," the duration is ongoing and has been ongoing for 10 minutes, the business transaction associated with the anomaly is a "checkout" transaction.

The transaction flow map 1010 includes an e-commerce service application, an inventory service application, an inbound inventory database, another inventory database, an order processing service application, and an orders database. The time spent at each application or database by the request is indicated in the flow map, as well as a percentage of the overall time the request spent at that application. Other information such as the type of request received between two applications is also shown to illustrate the relationships between the applications which perform the distributed application.

Load information frame 1020 indicates the load result for the particular request in a format of calls received per minute. The average response time frame indicates the average response time for the request over time. The incident description frame 1020 indicates a description of the incident associated with the anomaly. The request summary indicates the number of requests which fall into different categories, such as normal, slow, very slow, errors, and stalls. Other information, including recent request snapshots with call graphs and recent errors, may also be illustrated within a transaction flow map interface 1000.

Figure 11A:
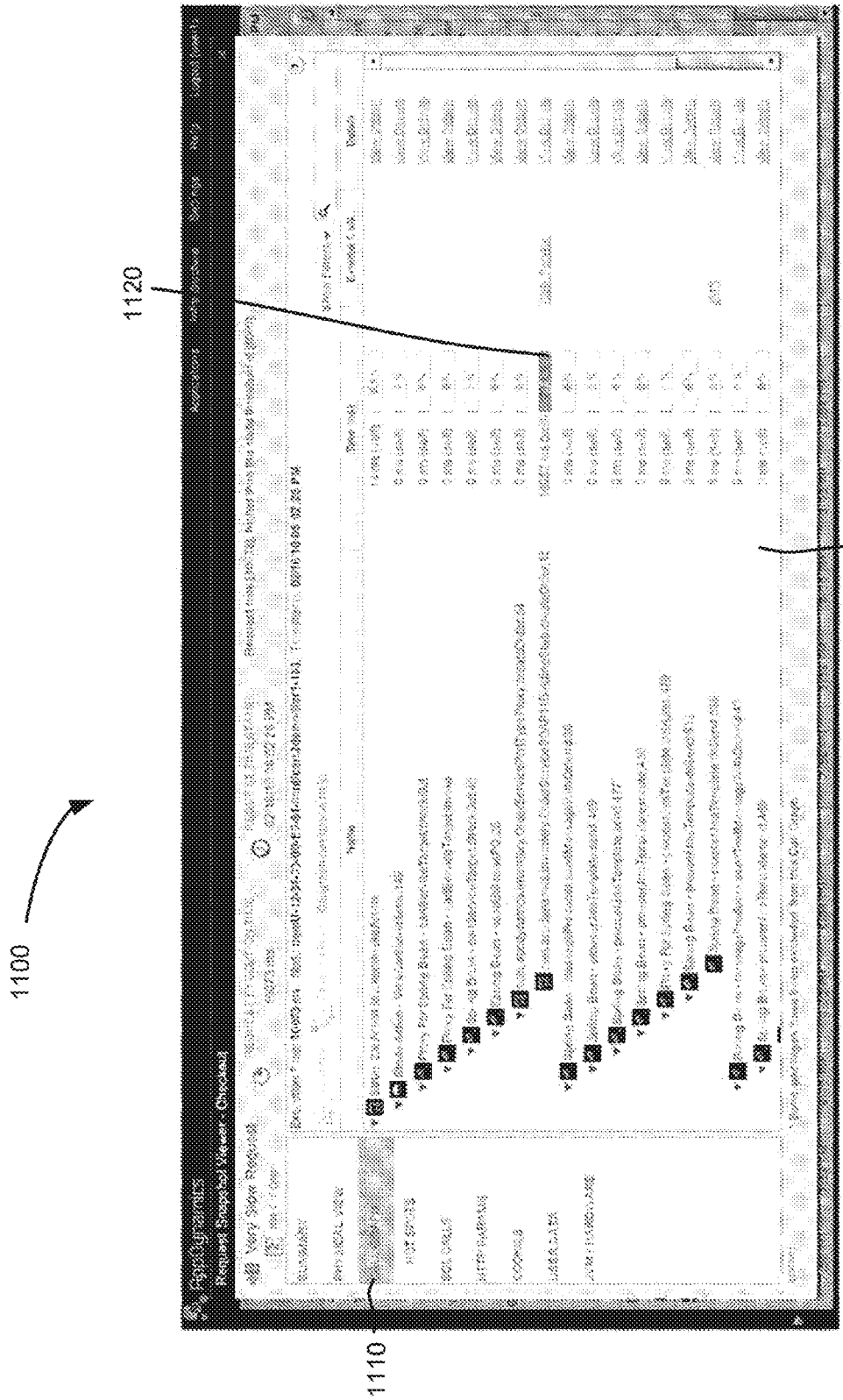
FIG. 11A is an exemplary interface for providing a call graph.
Figure 12:
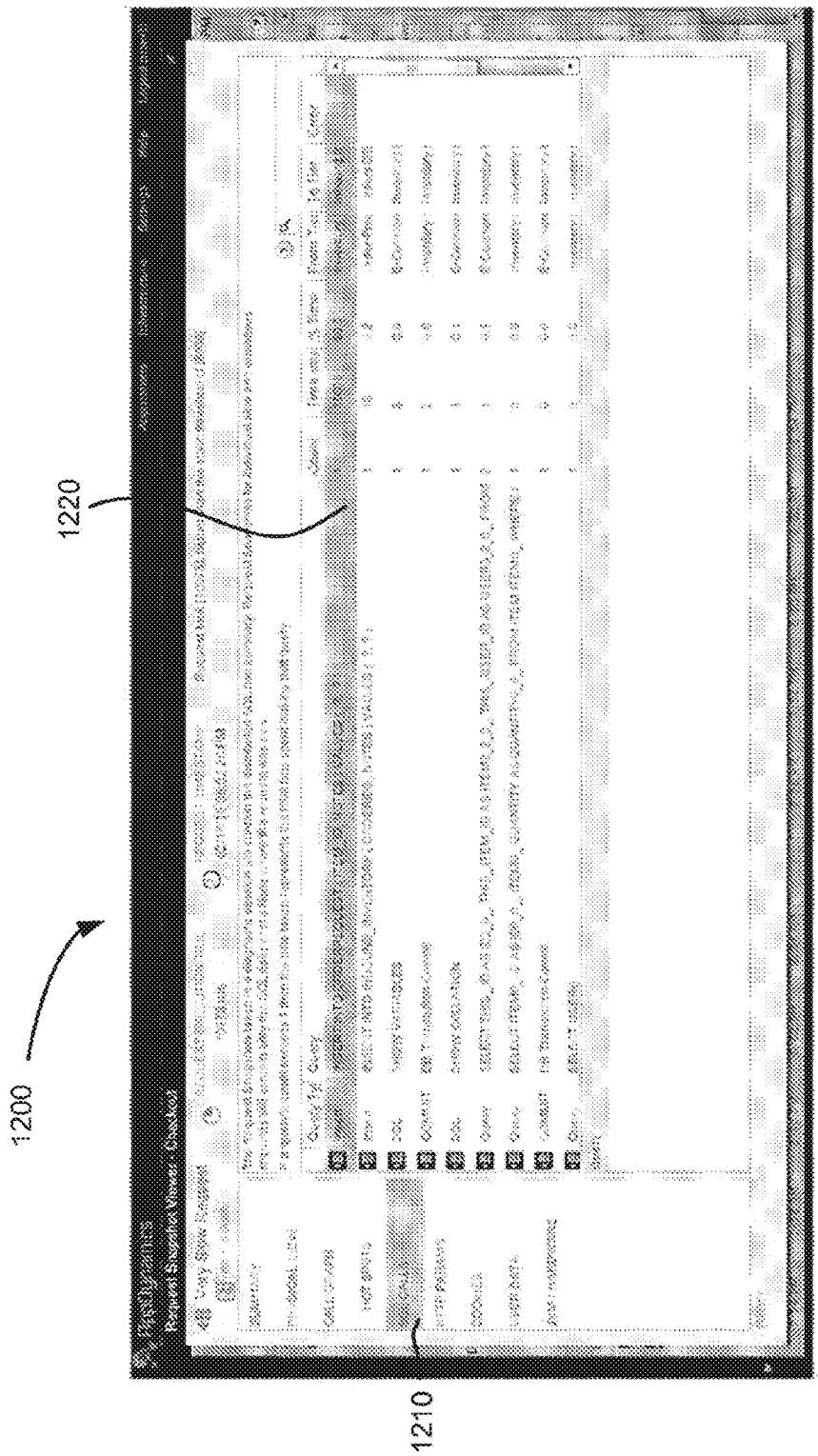
FIG. 12 is an exemplary interface for providing SQL call information.

FIG. 11A is an exemplary interface for providing a call graph. Interface 1100 includes a selection menu 1110 on the left side of the interface in which a call graph is selected. The main window 1120 of interface 1100 illustrates the call graph and in particular a hierarchical representation of calls made while executing the current request. An indication 1130 of an incident is indicated within the call graph. For each step in the call graph, the name of the application called, the time at which the application executed, external calls made by the application, and other details are illustrated in the call graph.

Figure 11B:
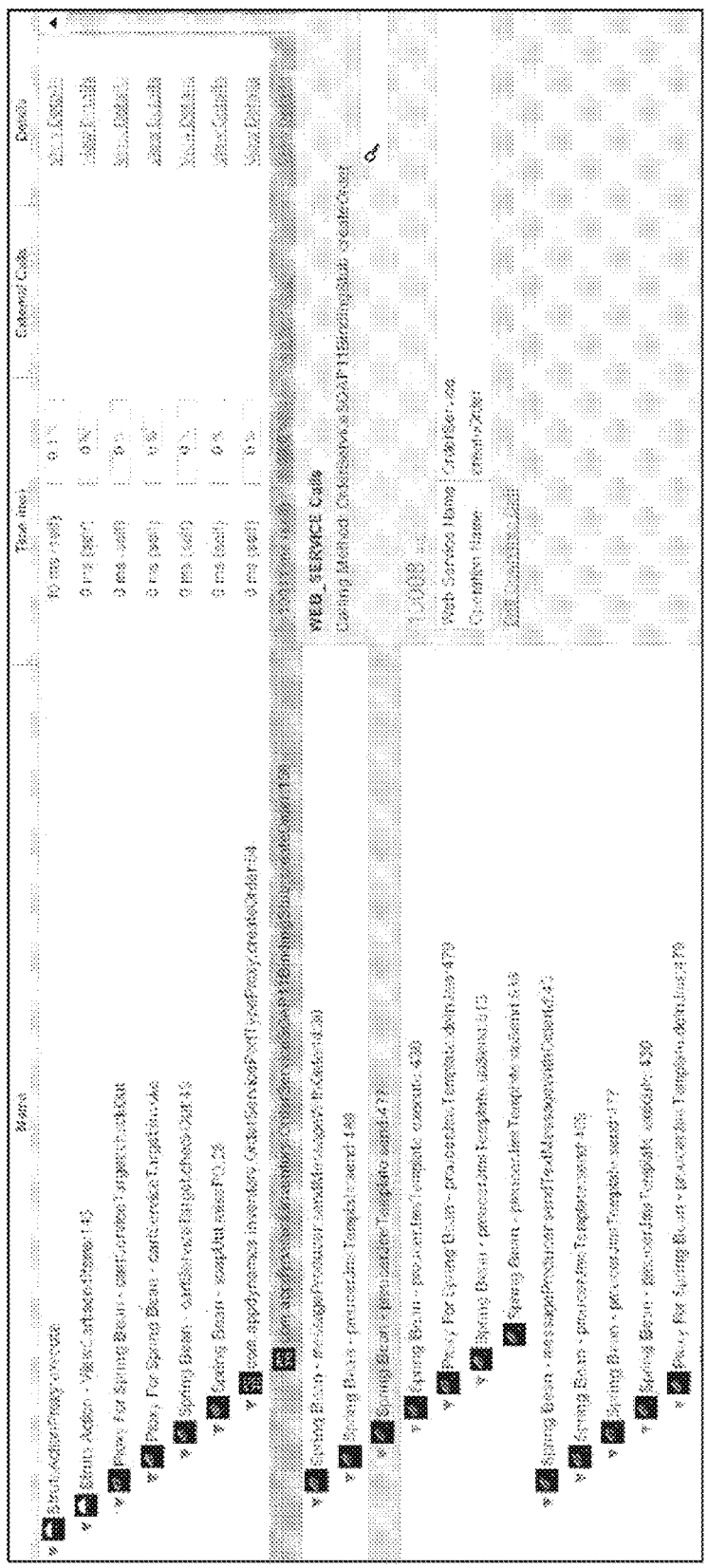
FIG. 11B is an exemplary interface for providing more information for selected call within a call graph.

FIG. 11B is an exemplary interface for providing more information for selected call within a call graph. In FIG. 11B, a window appears in the in the lower right portion of the interface. The window provides more information for a selected portion of a call stack. The selected portion is a method titled "OrderServiceSDAP11Binding Stub:createOrder." The information provided in the window includes the web service name "Order Service", the operation name "createOrder", and the time, 10008 ms, taken to complete the call.

FIG. 12 is an exemplary interface for providing SQL call information. Interface 1200 of FIG. 12 indicates that SQL calls are indicated in a selection menu within the interface. The SQL call information is illustrated in a list of calls. An incident 1220 may be highlighted which indicates an incident associated with a particular SQL call. For each SQL call, information is illustrated such as the query type, the query, a count, the time of execution, the percentage time of the total transaction, the tier the call is received from, the tier the call is made to, and other data.

Figure 13:
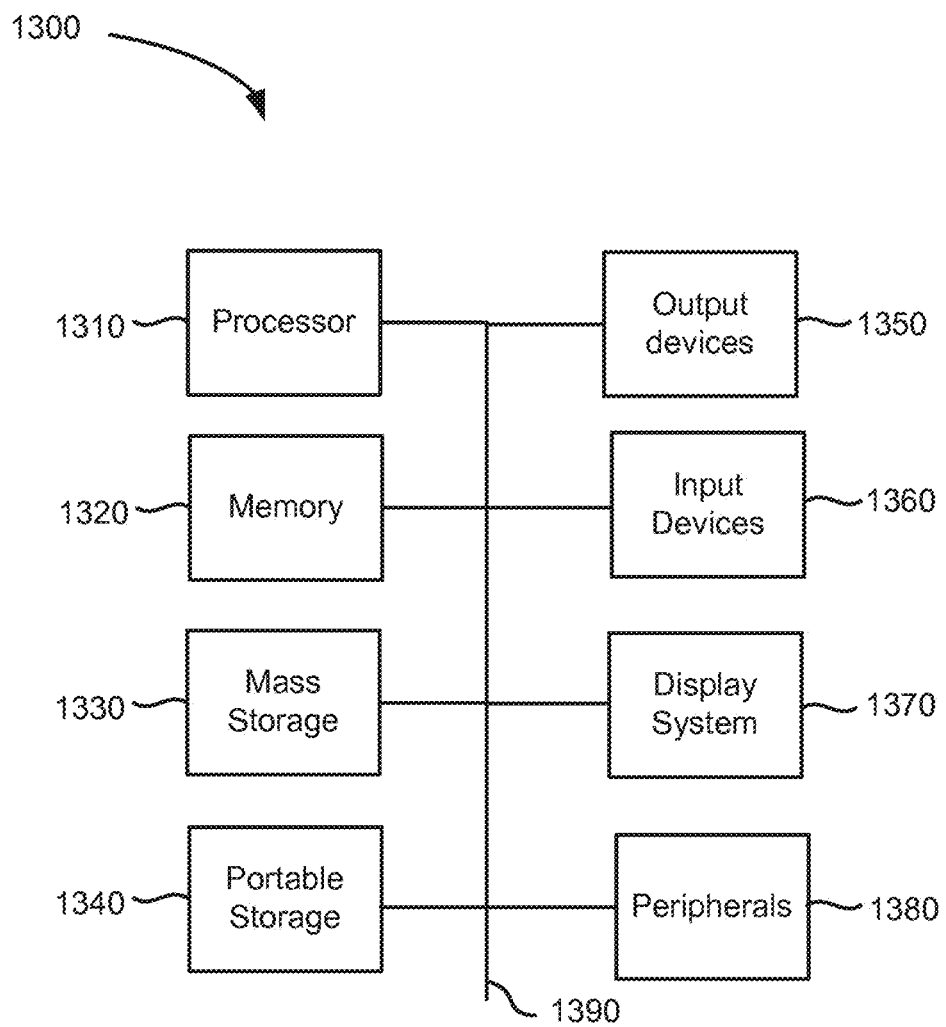
FIG. 13 is a block diagram of an exemplary system for implementing a computing device.

FIG. 13 illustrates an exemplary computing system 1300 that may be used to implement a computing device for use with the present technology. System 1300 of FIG. 13 may be implemented in the contexts of the likes of data store 130, application server 120, network server 130, database 122, and clients 150-160. The computing system 1300 of FIG. 13 includes one or more processors 1310 and memory 1310. Main memory 1310 stores, in part, instructions and data for execution by processor 1310. Main memory 1310 can store the executable code when in operation. The system 1300 of FIG. 13 further includes a mass storage device 1330, portable storage medium drive(s) 1340, output devices 1350, user input devices 1360, a graphics display 1370, and peripheral devices 1380.

The components shown in FIG. 13 are depicted as being connected via a single bus 1390. However, the components may be connected through one or more data transport means. For example, processor unit 1310 and main memory 1310 may be connected via a local microprocessor bus, and the mass storage device 1330, peripheral device(s) 1380, portable storage device 1340, and display system 1370 may be connected via one or more input/output (I/O) buses.

Mass storage device 1330, which may be implemented with a magnetic disk drive or an optical disk drive, is a non-volatile storage device for storing data and instructions for use by processor unit 1310. Mass storage device 1330 can store the system software for implementing embodiments of the present invention for purposes of loading that software into main memory 1310.

Portable storage device 1340 operates in conjunction with a portable non-volatile storage medium, such as a floppy disk, compact disk or Digital video disc, to input and output data and code to and from the computer system 1300 of FIG. 13. The system software for implementing embodiments of the present invention may be stored on such a portable medium and input to the computer system 1300 via the portable storage device 1340.

Input devices 1360 provide a portion of a user interface. Input devices 1360 may include an alpha-numeric keypad, such as a keyboard, for inputting alpha-numeric and other information, or a pointing device, such as a mouse, a trackball, stylus, or cursor direction keys. Additionally, the system 1300 as shown in FIG. 13 includes output devices 1350. Examples of suitable output devices include speakers, printers, network interfaces, and monitors.

Display system 1370 may include a liquid crystal display (LCD) or other suitable display device. Display system 1370 receives textual and graphical information, and processes the information for output to the display device.

Peripherals 1380 may include any type of computer support device to add additional functionality to the computer system. For example, peripheral device(s) 1380 may include a modem or a router.

The components contained in the computer system 1300 of FIG. 13 are those typically found in computer systems that may be suitable for use with embodiments of the present invention and are intended to represent a broad category of such computer components that are well known in the art. Thus, the computer system 1300 of FIG. 13 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for performing a diagnostic session for a request, comprising:
   initiating collection of diagnostic data associated with a request, the request part of a distributed business transaction performed by a plurality of computing machines, the request received by a first machine of the plurality of computing machines, the request identified based on prior performance of at least a portion of the distributed business transaction;
   sampling an application thread by an agent located on each of two or more servers, the application threads associated with the same distributed business transaction occurring over the plurality of computing machines;
   associating the sampled thread data with a distributed transaction identifier; and
   storing the diagnostic data with the distributed transaction identifier by the agents.

2. The method of claim 1, wherein the collection of diagnostic data is initiated by detection of an anomaly by a controller which receives runtime data from remote agents, the remote agents including the agents located on each of two or more servers.

3. The method of claim 1, wherein the collection of diagnostic data is initiated by detection of an anomaly by an agent monitoring a server which processes the request.

4. The method of claim 1, wherein sampling an application thread includes sampling a thread call stack handling a request at a server.

5. The method of claim 1, wherein the diagnostic data including the performance of one or more outgoing calls performed as part of the request, at least one outgoing call associated with an application thread at a second server of the two or more servers.

6. The method of claim 1, further comprising:
   detecting an outgoing call to a second server of the two or more servers; and
   modifying the call to the second server with a diagnostic identifier,
   wherein a thread call stack handling the call at the second server is sampled in response to detecting the diagnostic identifier at the second server.

7. The method of claim 1, wherein the business transaction is associated with a diagnostic identifier.

8. A non-transitory computer readable storage medium having embodied thereon a program, the program being executable by a processor to perform a method for performing a diagnostic session for a request, the method comprising:
   initiating collection of diagnostic data associated with a request, the request part of a distributed business transaction performed by a plurality of computing machines, the request received by a first machine of the plurality of computing machines, the request identified based on prior performance of at least a portion of the distributed business transaction;
   sampling an application thread by an agent located on each of two or more servers, the application threads associated with the same distributed business transaction occurring over the plurality of computing machines; and
   associating the sampled thread data with a distributed transaction identifier; and
   storing the diagnostic data with the distributed transaction identifier by the agents.

9. A system for performing a diagnostic session for a request, comprising:
   a first application server having memory; and
   one or more modules stored in memory of the first application server and executable by a processor to initiate collection of diagnostic data associated with a request, the request part of a distributed business transaction performed by a plurality of computing machines, the request received by a first machine of the plurality of computing machines, the request identified based on prior performance of at least a portion of the distributed business transaction, sample an application thread by an agent located on each of two or more servers, the application threads associated with the same distributed business transaction occurring over the plurality of computing machines, associate the sampled thread data with a distributed transaction identifier, and store the diagnostic data with the distributed transaction identifier by the agents.

* * * * *